(12) United States Patent
Aleti et al.

(10) Patent No.: US 11,513,844 B1
(45) Date of Patent: *Nov. 29, 2022

(54) PIPELINE SET SELECTION BASED ON DUTY CYCLE ESTIMATION

(71) Applicant: Splunk Inc., San Francisco, CA (US)

(72) Inventors: Bharath Kishore Reddy Aleti, San Ramon, CA (US); Mitchell Neuman Blank, London (GB); Anish Shrigondekar, Sunnyvale, CA (US)

(73) Assignee: Splunk Inc., San Francisco, CA (US)

(*) Notice: Subject to any disclaimer, the term of this patent is extended or adjusted under 35 U.S.C. 154(b) by 113 days.

This patent is subject to a terminal disclaimer.

(21) Appl. No.: 17/070,110

(22) Filed: Oct. 14, 2020

Related U.S. Application Data

(63) Continuation of application No. 16/399,773, filed on Apr. 30, 2019, now Pat. No. 10,853,082.

(51) Int. Cl.
*G06F 9/48* (2006.01)

(52) U.S. Cl.
CPC .......... *G06F 9/4881* (2013.01); *G06F 9/4806* (2013.01); *G06F 9/4843* (2013.01)

(58) Field of Classification Search
CPC ..... G06F 9/4881; G06F 9/4806; G06F 9/4843
See application file for complete search history.

(56) References Cited

U.S. PATENT DOCUMENTS

| | | | |
|---|---|---|---|
| 7,937,344 B2 | 5/2011 | Baum et al. | |
| 7,996,839 B2* | 8/2011 | Farkas | G06F 9/5044 |
| | | | 702/182 |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2009/0049443 A1 | 2/2009 | Powers et al. | |
| 2014/0337849 A1* | 11/2014 | Seo | G06F 9/46 |
| | | | 718/102 |
| 2015/0006630 A1 | 1/2015 | Thomas et al. | |
| 2017/0213171 A1 | 7/2017 | Dubash et al. | |

(Continued)

OTHER PUBLICATIONS

Vose, Michael D., "A Linear Algorithm For Generating Random Numbers With a Given Distribution"; IEEE Transactions on Software Engineering; vol. 17; Issue 9; pp. 972-975; Sep. 1991 (4 pages).

(Continued)

*Primary Examiner* — Benjamin C Wu
(74) *Attorney, Agent, or Firm* — Ferguson Braswell Fraser Kubasta PC

(57) ABSTRACT

A computer implemented system is described for assigning executable jobs to pipeline sets, whereby the jobs may be network based computer jobs. The assigning includes generating a weight for each pipeline set of multiple pipeline sets to obtain multiple weights. Generating a weight includes obtaining duty cycle metrics for pipeline software threads in the pipeline set. The duty cycle metrics include a measure of an amount of time that a corresponding pipeline thread is executing and actively processing data. Generating the weight further includes determining the weight for the pipeline set based at least in part on the duty cycle metrics. The method further includes assigning a job request to a target pipeline set selected from the pipeline sets according to a weighted random algorithm, wherein the weighted random algorithm uses the weights.

20 Claims, 21 Drawing Sheets

(56) References Cited

U.S. PATENT DOCUMENTS

| | | | |
|---|---|---|---|
| 2017/0220384 A1* | 8/2017 | Anderson | G06F 9/4893 |
| 2018/0027066 A1* | 1/2018 | Van De Groenendaal | G02B 6/4292 709/226 |
| 2018/0332138 A1 | 11/2018 | Liu et al. | |
| 2019/0042999 A1 | 2/2019 | Del Balso, Jr. et al. | |
| 2019/0098106 A1 | 3/2019 | Mungel et al. | |
| 2019/0354398 A1 | 11/2019 | Aggarwal et al. | |
| 2020/0112511 A1 | 4/2020 | Honnappa et al. | |
| 2020/0184366 A1 | 6/2020 | Mandal et al. | |
| 2020/0279173 A1* | 9/2020 | Gupta | H04L 41/5022 |

OTHER PUBLICATIONS

Dahlin, Michael, "Interpreting Stale Load Information"; ICDCS '99: Proceedings of the 19th IEEE International Conference on Distributed Computing Systems; <http://www.cs.utexas.edu/users/less/publications/research/icdcs99-oad.pdf>; May 31-Jun. 4, 1999 (12 pages).

Gregg, Brendan, "Linux Load Averages: Solving the Mystery"; Brendan Gregg's Blog: <http://www.brendangregg.com/blog/2017-08-08/linux-load-averages.html>; Aug. 8, 2017 (18 pages).

Bath, Amrit et al., "How splunkd works"; Splunk Conference 2017; <https://conf.splunk.com/files/2017/slides/how-splunkd-works.pdf>; Sep. 25-28, 2017 (65 pages).

Schwarz, Keith, "Darts, Dice, and Coins: Sampling from a Discrete Distribution"; <http://www.keithschwarz.com/darts-dice-coins/>; Last Updated Dec. 29, 2011 (31 pages).

Dahlin, Michael, "Interpreting Stale Load Information"; Extended version; <https://www.cs.utexas.edu/users/dahlin/papers/tpds-loadBalance00.pdf>; Jun. 1999 (34 pages).

Blei, D.M. et al., "Latent Dirichlet Allocation" Journal of Machine Learning Research 3, Jan. 2003, pp. 993-1022 (30 pages).

Carasso, David, "Exploring Splunk" published by CITO Research, New York, NY, Apr. 2012 (156 pages).

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010 (9 pages).

Svaid, K., "QPS,KW-hr,MTVF,DT,PUE,IOPS,DB/RH, . . . A Day in the Life of a Datacenter Infrastructure Architect", Workshop on Managing Systems via Log Analysis and Machine Learning Techniques, (SLAML '10), Vancouver, BC, Canada, Oct. 3, 2010 (7 pages).

* cited by examiner

Original Search:
Search "error" | stats count BY host  ← 602

Sent to peers:
Search "error" | prestats count BY host  ← 604

Executed by search head:
Aggregate the prestats results received from peers  ← 606

FIG. 6

PIPELINE SET SELECTION BASED ON DUTY CYCLE ESTIMATION

CROSS REFERENCE TO RELATED APPLICATION

This application is a continuation of, and thereby claims benefit under 35 U.S.C. § 120 to, U.S. patent application Ser. No. 16/399,773, filed on Apr. 30, 2019, which is incorporated herein by reference in its entirety.

BACKGROUND

Load distribution is the process of assigning of jobs to application threads. A job is a unit of work for execution. For example, a job may be a request that should be processed. Generally, load distribution may be performed using a round robin algorithm. In the round robin algorithm, jobs are assigned to the next thread in a circular order of threads.

BRIEF DESCRIPTION OF DRAWINGS

In the drawings:

FIG. 6 illustrates how a search query received from a client at a search head can split into two phases in accordance with a disclosed embodiment.

DETAILED DESCRIPTION

Figure 1:
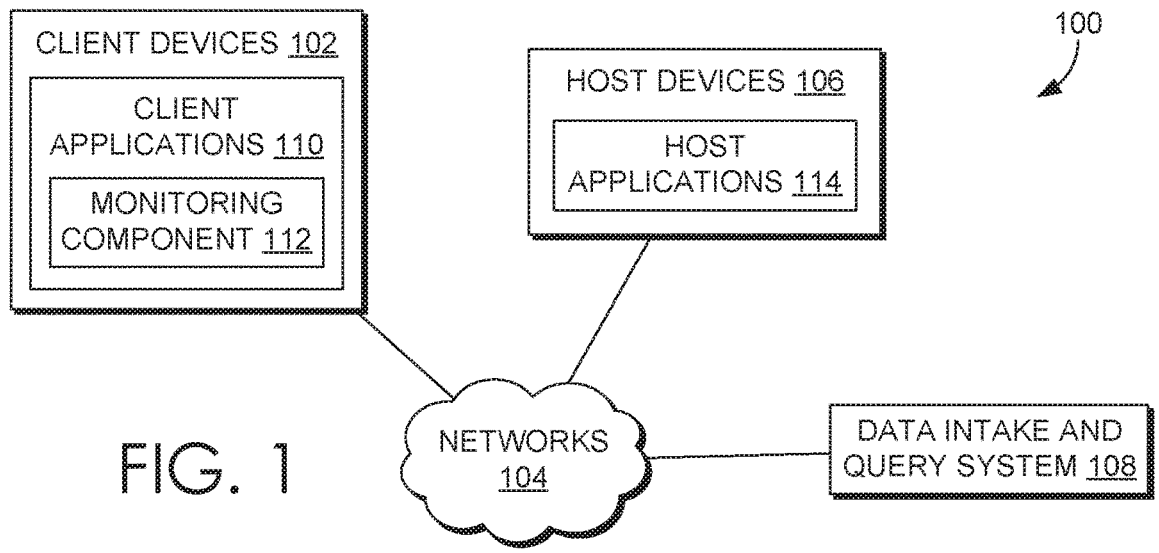
FIG. 1 illustrates a networked computer environment in which an embodiment may be implemented.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, embodiments are directed to application thread management using duty cycle measurements. A duty cycle is the time that an application thread spends in active performance of processing data. In other words, an application thread may use the central processing unit (CPU) and memory while still waiting for data to be processed. Thus, CPU and memory usage may incorrectly show that a thread is busy. One or more embodiments use a duty cycle ownership object that starts tracking time only when data exists in a consumer queue for the thread and before the thread starts processing the data. In one or more embodiments, stopping the time is passively performed as the start of the duty cycle ownership object is scoped.

In one or more embodiments, a group of threads are grouped into a thread set. One or more embodiments determine the duty cycle metric for the thread set based on the duty cycle metric of threads in the thread set. Using the duty cycle metric for the thread set, the thread set may be managed.

By way of an example, one or more embodiments may be applied to pipeline processing of jobs. Threads may be grouped based on being threads of a same pipeline set. Jobs may be assigned to a pipeline set based on the duty cycle metric determined for the threads of the pipeline set and generating a duty cycle metric for the pipeline set. For example, the pipeline set may be an ingest pipeline that is configured to index and store data into a data store. Multiple ingest pipeline sets may exist. In the ingest case, an ingest request may not be reflective of the amount of data to process by the ingest pipeline set and store in the data store. Further, the amount of data may greatly vary between ingest requests. Therefore, assigning ingest requests in a round robin style may not provide for balancing distribution of the ingested data. By assigning using duty cycle metrics, one or more embodiments provide for a more balance use of hardware and software resources of a computing system.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Acceleration Techniques
      2.8.1. Aggregation Technique
      2.8.2. Keyword Index
      2.8.3. High Performance Analytics Store
      2.8.4. Accelerating Report Generation
   2.9. Security Features
   2.10. Data Center Monitoring
   2.11. Cloud-Based System Overview
   2.12. Searching Externally Archived Data
      2.12.1. ERP Process Features
   2.13. IT Service Monitoring
   2.14. Cloud-Based Architecture
3.0. Workflow Management
4.0. Hardware
   1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106.

Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As an example, the client application may be a web application that is served to and displayed in a web browser or other local application. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
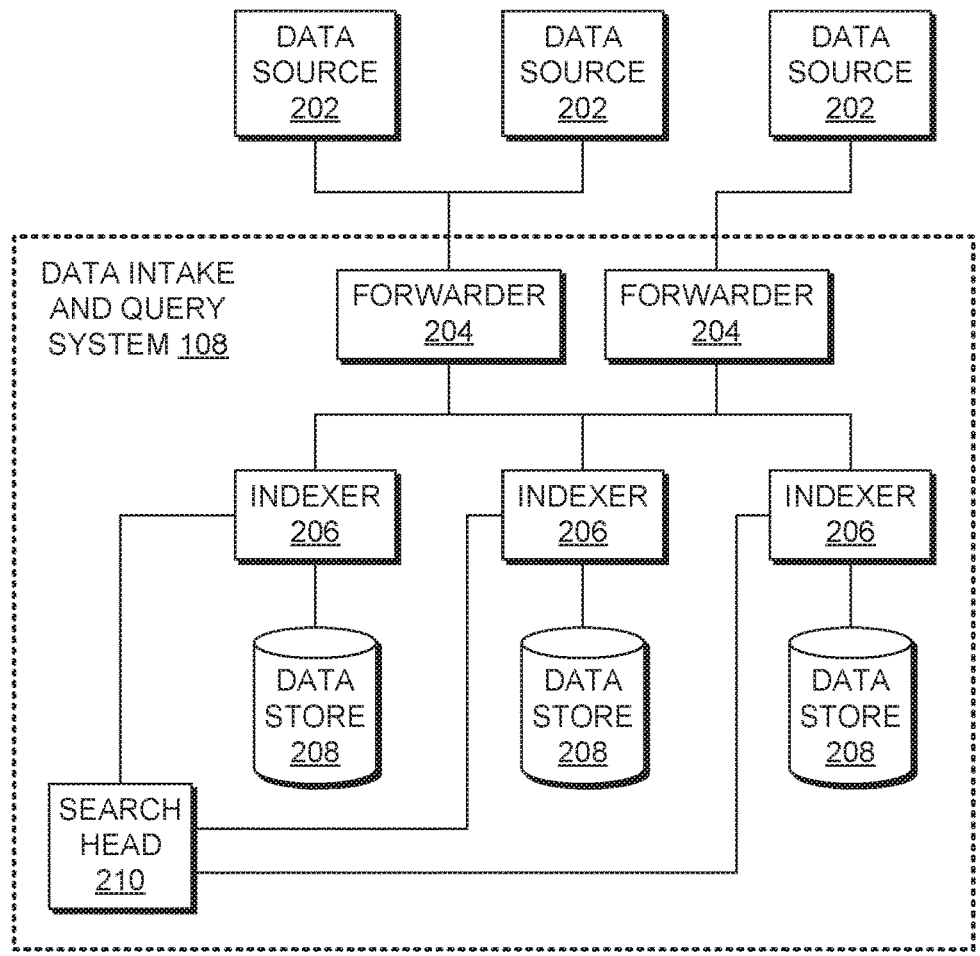
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
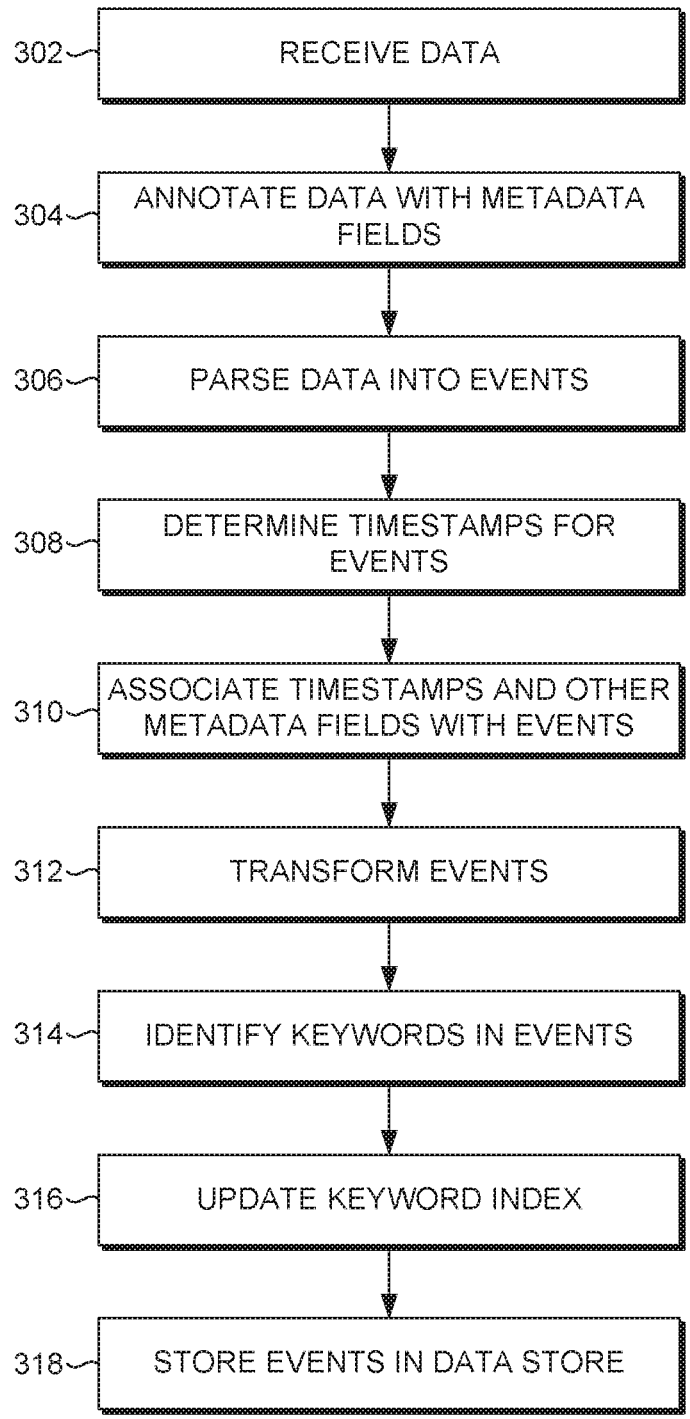
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally, or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events and may also include one or more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equal sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
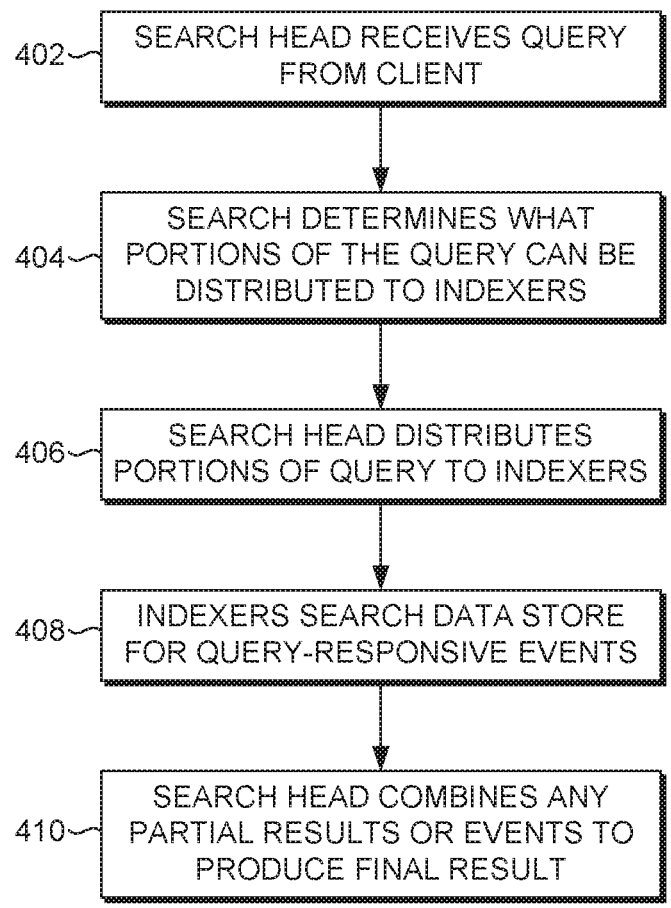
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
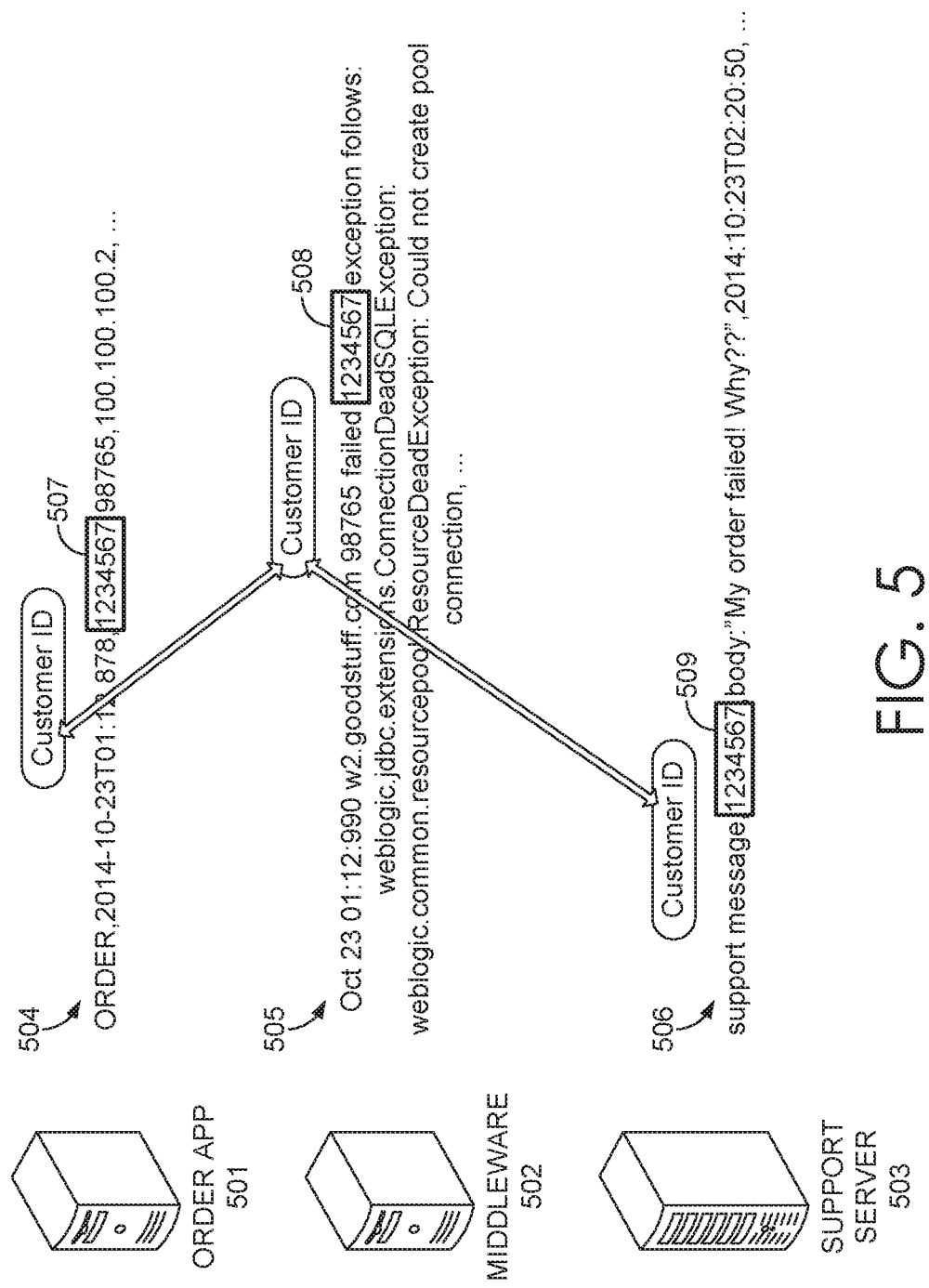
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8.1. Aggregation Technique

To facilitate faster query processing, a query can be structured such that multiple indexers perform the query in parallel, while aggregation of search results from the multiple indexers is performed locally at the search head. For example, FIG. 6 illustrates how a search query 602 received from a client at a search head 210 can split into two phases, including: (1) subtasks 604 (e.g., data retrieval or simple filtering) that may be performed in parallel by indexers 206 for execution, and (2) a search results aggregation operation 606 to be executed by the search head when the results are ultimately collected from the indexers.

During operation, upon receiving search query 602, a search head 210 determines that a portion of the operations involved with the search query may be performed locally by the search head. The search head modifies search query 602 by substituting "stats" (create aggregate statistics over results sets received from the indexers at the search head) with "prestats" (create statistics by the indexer from local results set) to produce search query 604, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.8.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.8.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.8.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criterion, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.9. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REG- ISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

2.10. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

2.11. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one or more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 7:
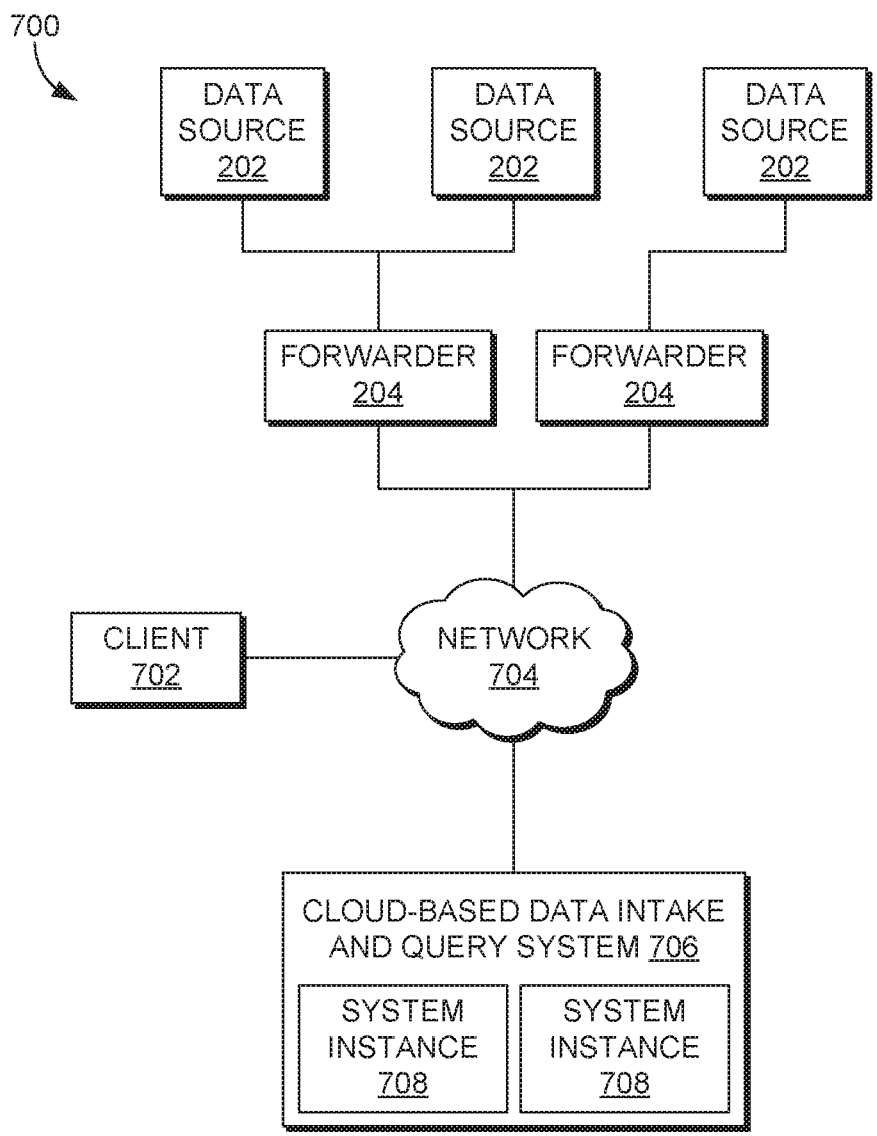
FIG. 7 illustrates a block diagram of an example cloud-based data intake and query system in accordance with the disclosed embodiments.

FIG. 7 illustrates a block diagram of an example cloud-based data intake and query system. Similar to the system of FIG. 2, the networked computer system 700 includes input data sources 202 and forwarders 204. These input data sources and forwarders may be in a subscriber's private computing environment. Alternatively, they might be directly managed by the service provider as part of the cloud service. In the example system 700, one or more forwarders 204 and client devices 702 are coupled to a cloud-based data intake and query system 706 via one or more networks 704. Network 704 broadly represents one or more LANs, WANs, cellular networks, intranetworks, internetworks, etc., using any of wired, wireless, terrestrial microwave, satellite links, etc., and may include the public Internet, and is used by client devices 702 and forwarders 204 to access the system 706. Similar to the system of 108, each of the forwarders 204 may be configured to receive data from an input source and to forward the data to other components of the system 706 for further processing.

In an embodiment, a cloud-based data intake and query system 706 may comprise a plurality of system instances 708. In general, each system instance 708 may include one or more computing resources managed by a provider of the cloud-based system 706 made available to a particular subscriber. The computing resources comprising a system instance 708 may, for example, include one or more servers or other devices configured to implement one or more forwarders, indexers, search heads, and other components of a data intake and query system, similar to system 108. As indicated above, a subscriber may use a web browser or other application of a client device 702 to access a web portal or other interface that enables the subscriber to configure an instance 708.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 708) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD are centrally visible).

2.12. Searching Externally Archived Data

Figure 8:
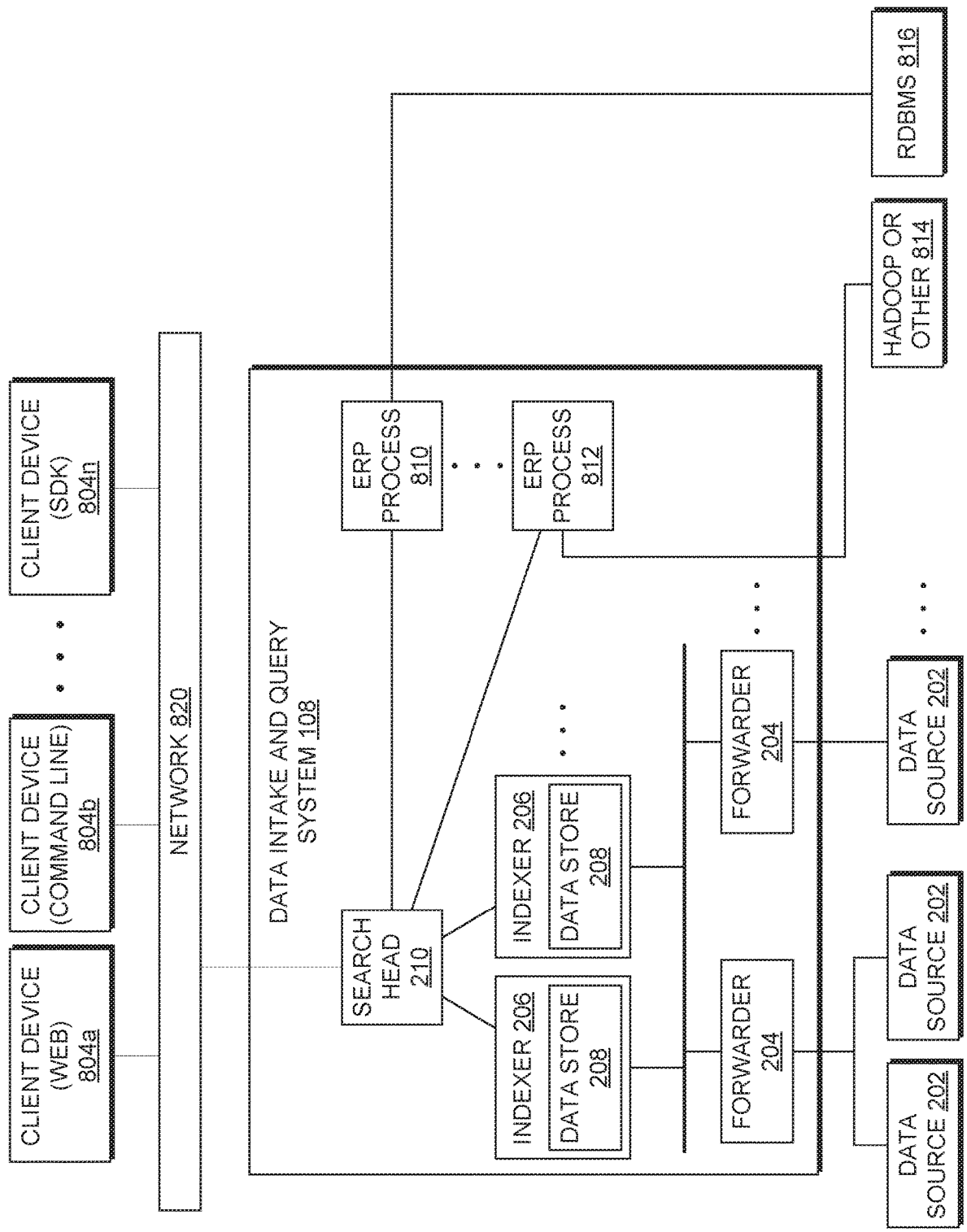
FIG. 8 illustrates a block diagram of an example data intake and query system that performs searches across external data systems in accordance with the disclosed embodiments.

FIG. 8 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 804 over network connections 820. As discussed above, the data intake and query system 108 may reside in an enterprise location, in the cloud, etc. FIG. 8 illustrates that multiple client devices 804a, 804b, . . . , 804n may communicate with the data intake and query system 108. The client devices 804 may communicate with the data intake and query system using a variety of connections. For example, one client device in FIG. 8 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 804 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 810. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 810, 812. FIG. 8 shows two ERP processes 810, 812 that connect to respective remote (external) virtual indices, which are indicated as a Hadoop or another system 814 (e.g., Amazon S3, Amazon EMR, other Hadoop Compatible File Systems (HCFS), etc.) and a relational database management system (RDBMS) 816. Other virtual indices may include other file organizations and protocols, such as Structured Query Language (SQL) and the like. The ellipses between the ERP processes 810, 812 indicate optional additional ERP processes of the data intake and query system 108. An ERP process may be a computer process that is initiated or spawned by the search head 210 and is executed by the search data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 810, 812 receive a search request from the search head 210. The search head may optimize the received search request for execution at the respective external virtual index. Alternatively, the ERP process may receive a search request as a result of analysis performed by the search head or by a different system process. The ERP processes 810, 812 can communicate with the search head 210 via conventional input/output routines (e.g., standard in/standard out, etc.). In this way, the ERP process receives the search request from a client device such that the search request may be efficiently executed at the corresponding external virtual index.

The ERP processes 810, 812 may be implemented as a process of the data intake and query system. Each ERP process may be provided by the data intake and query system or may be provided by process or application providers who are independent of the data intake and query system. Each respective ERP process may include an interface application installed at a computer of the external result provider that ensures proper communication between the search support system and the external result provider. The ERP processes 810, 812 generate appropriate search requests in the protocol and syntax of the respective virtual indices 814, 816, each of which corresponds to the search request received by the search head 210. Upon receiving search results from their corresponding virtual indices, the respective ERP process passes the result to the search head 210, which may return or display the results, or a processed set of results based on the returned results to the respective client device.

Client devices 804 may communicate with the data intake and query system 108 through a network interface 820, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.12.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.13. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a system available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

2.14 Cloud-Based Architecture

As shown in the previous figures, various embodiments may refer to a data intake and query system 108 that includes one or more of a search head 210, an indexer 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3.0 Workflow Management

In general, workflow management is the assigning of jobs to application threads in a manner that equalizes the distribution of the amount of work across threads. Because each job may involve an unequal amount of work, equal distribution of jobs may create a scenario of unequal amount of work. Thus, one or more embodiments use a duty cycle metric to estimate the business of application threads executing. The duty cycle metric gathers information about the length of time during a period in which the application thread is performing useful work. Specifically, the duty cycle metric is a measure of an amount of time that a corresponding pipeline thread is executing and actively processing data as opposed to taking an execution cycle to wait for data. In other words, the duty cycle metric is not a measure of central processing unit (CPU) or other hardware resource assigned to the application thread.

Figure 9:
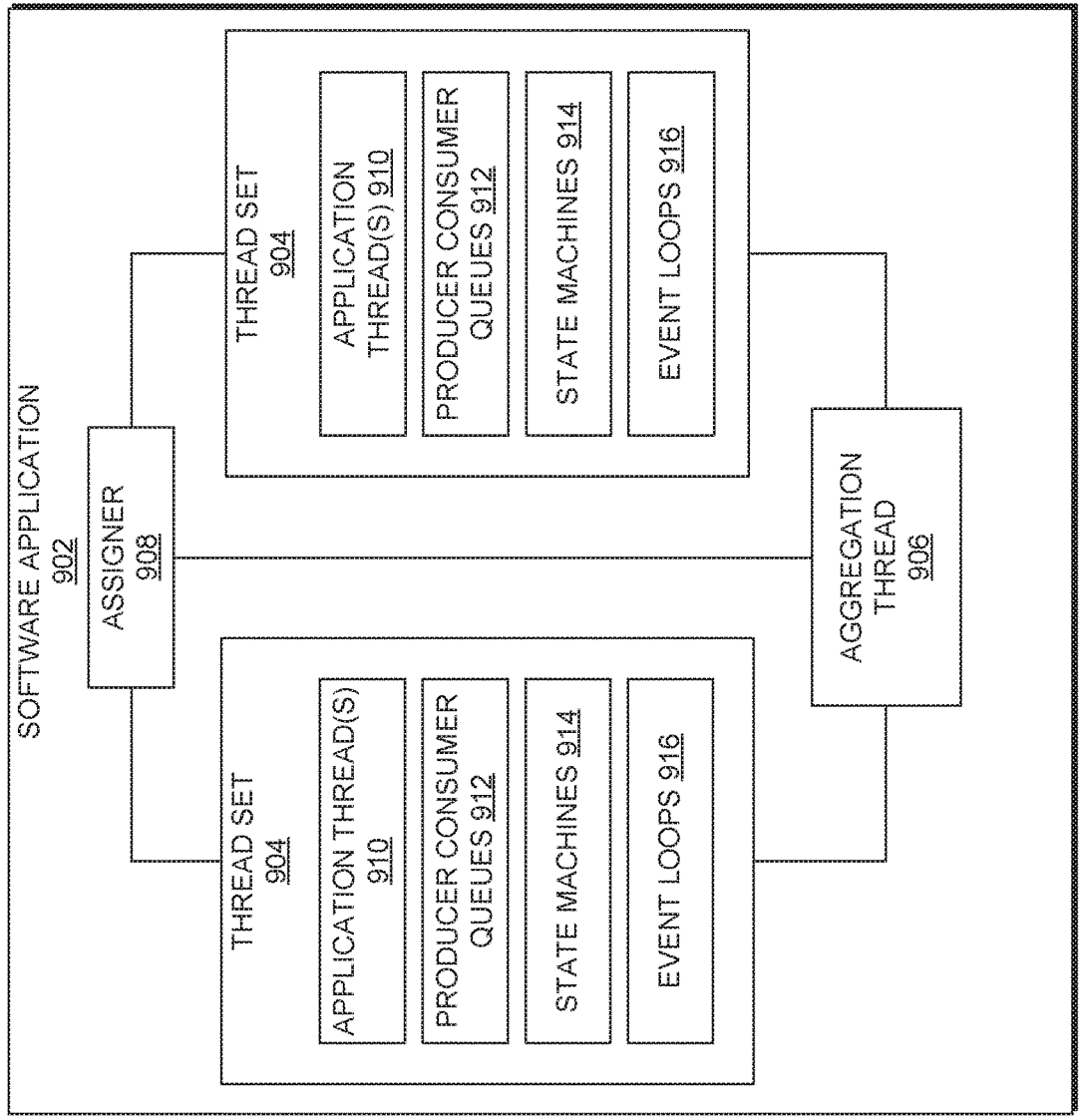
FIG. 9 illustrates a diagram of a software application in accordance with one or more embodiments.

Turning now to FIG. 9, FIG. 9 illustrates a diagram of a software application 902 in accordance with one or more embodiments. A software application 902 is any software program, such as an enterprise system, a user level application, an operating system, a security application, a database server, or any other application having multiple application threads. The software application 902 may be or may execute within a virtual machine, execute on a server, execute on a user's computing device. By way of an example, the software application may be the SPLUNK®

ENTERPRISE system, or a component thereof, described above with reference to FIGS. 1-8. As shown in FIG. 9, the software application may include one or more thread set(s) 904, at least one aggregation thread 906, and an assigner 908. Each of these components is described below.

In one or more embodiments, a thread set 904 is a group of application threads 910 that operate together to process a job. A job is a unit of work for execution. For example, a job may be data or a request that should be processed. The amount of processing may vary greatly between jobs. For example, if the job is a data ingestion task to index and store data in a data store, then the amount of processing is dependent on the amount of data to be stored. As another example, if the job is to process a query for data and transmit results, the amount of processing may be dependent on the amount of data searched, the degree of complication of the query (e.g., in terms of the number of data stores and correlations to perform, and other aspects of the query). In one or more embodiments, each thread set is replica that is capable of processing the same jobs as other thread sets. In other words, the same job may be distributed to any of the thread sets. In some embodiments, the replication is only with respect to a portion of thread sets. For example, the thread sets may be partitioned into groups, wherein within a group of thread sets, the thread sets are replicas whereas a thread set may not be a replica of a thread set outside of the group.

By way of some examples of thread sets, a thread set may be management thread sets, indexing thread sets, metadata thread sets, thread pool worker thread sets, etc. Management thread sets include one or more management application threads that process management jobs for the software application. Indexing thread sets include one or more indexing application threads that process jobs for indexing data in the data stores. Metadata thread sets include one or more application threads that process jobs for extracting and maintaining metadata. Thread pool worker thread sets include one or more application threads that process queries. Other types of thread sets having other types of application threads may be used without departing from the scope of the disclosure.

Continuing with the discussion of FIG. 9, a thread set 904 may include multiple application threads 910, producer consumer queues 912, state machines 914 and event loops 916. An application thread 910 is a user level thread that is configured to process a portion of the job. The application thread 910 may be represented by a program counter, register, execution stack, and control block. Multiple application threads may exist in a thread set. Each application thread of a single thread set is configured to process individual portions of the job. In one or more embodiments, the individual portions are non-overlapping.

Application threads 910 may communicate with each other using producer consumer queues 912. A producer consumer queue is a queue whereby a first application thread (i.e., the producer) adds data elements to the queue and a second application thread removes data elements from the queue. Thus, the data elements are communicated between the first and the second application thread. A state machines 914 is a construct that defines a finite set of states, the triggers causing transitions between states, and maintains the current state within the finite set of states. An event loop 916 is a programming construct that waits for and dispatches events or messages in the software application. The event loop issues a request to an internal or external "event provider" that provides events. The event loop then issues a call to the corresponding event handler.

In one or more embodiments, the processing of the job by application threads 910 may be dependent on a set of one or more conditions. In other words, the application thread may not actively process jobs until the set of conditions is satisfied. The set of conditions at least includes the condition that the application thread has data for actively processing the job. Other conditions may also exist that should also be satisfied in order to process the job. The set of conditions may include an event being issued from event loop 916, data in the producer consumer queue 912, the application thread being in a particular state in the state machine 914, the operating system schedule assigning execution cycles to the application thread, or other condition.

The thread sets 904 are connected to at least one aggregation thread 906. An aggregation thread 906 is a thread that obtains duty cycle metrics from the application threads in the thread sets 904 and assigns weights to the thread sets 904. For example, the aggregation thread 906 may access stored information, generate a duty cycle metric for each application thread. The duty cycle metric is a measure of the degree in which the corresponding application thread is processing data. The aggregation thread 906 may further use the duty cycle metric for each application thread in a thread set to generate a thread set duty cycle metric for the thread set. The thread set duty cycle metric is a value that defines the degree to which the thread set as a whole is processing the job. In other words, whereas each job may have varying amounts of processing to perform such that the number of jobs assigned to a thread set does not defined how busy the thread set is, the thread set duty cycle metric does define how busy the corresponding thread set is. In one or more embodiments, the aggregation thread 906 is configured to generate weights for the thread sets. The weight is a value that defines a relative measure of the degree in which the corresponding application thread is processing data as compared to other thread sets. In one or more embodiments, the weights are normalized values, such as values on a scale between 0 and 1. The operations by the aggregation thread 906 is described in further detail in FIGS. 16-18.

Continuing with FIG. 9, an assigner 908 is communicatively connected to the aggregation thread 906 and the thread sets 904. The assigner 908 includes functionality to assign jobs to the thread sets 906 based on the weights. In one or more embodiments, the assigner assigns jobs based on a weighted random distribution, whereby the probability that a thread set is randomly selected for a job is defined by the weight assigned to the thread set. By way of an example, the assigner 908 may implement Vose's alias method to apply a weighted random distribution and assign jobs based on the weighted random distribution.

Figure 10:
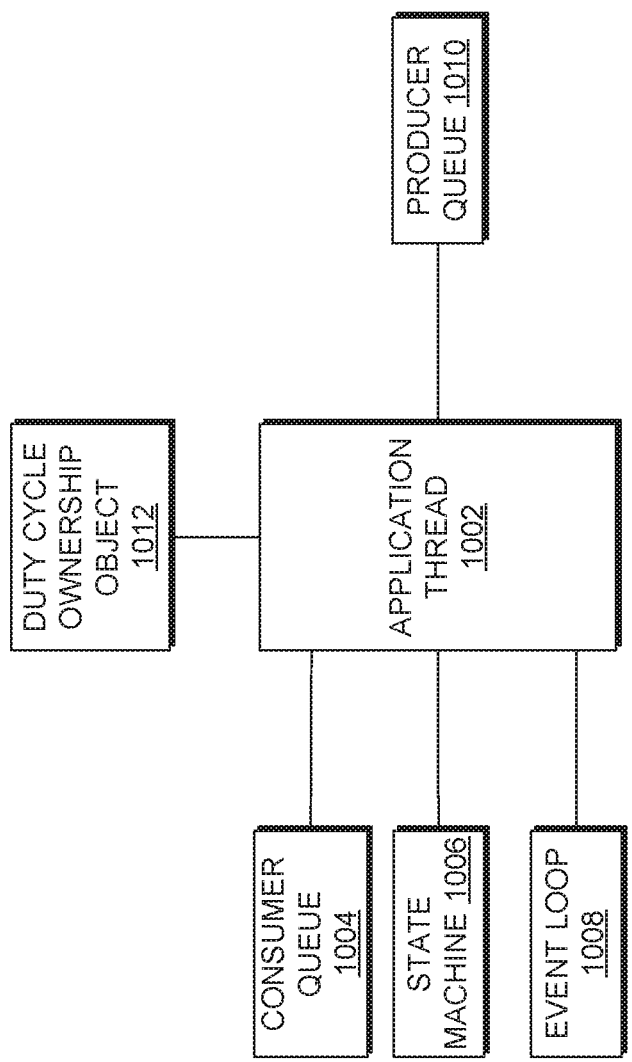
FIG. 10 illustrates a diagram of an application thread system in accordance with one or more embodiments.

Continuing with the discussion, FIG. 10 illustrates a diagram of an application thread system in accordance with one or more embodiments. Specifically, FIG. 10 shows a system diagram of at least some components that interface with application thread 1002. As shown in FIG. 10, the application thread 1002 may interface with a state machine 1006, an event loop 1008, and producer consumer queues (e.g., consumer queue 1004, producer queue 1010). The state machine 1006 and event loop 1008 are the same as the state machine and event loop described above with respect to FIG. 9. The consumer queue 1004 is the same as the producer consumer queue described above with the respect to FIG. 9. Likewise, the producer queue 1010 is the same as the producer consumer queue described above with the respect to FIG. 9. The consumer queue 1004 is referred to as a consumer queue with respect to the application thread because the application thread 1002 consumes (e.g., receives as input) data from the consumer queue 1004. Conversely, because the application thread 1010 produces (e.g., as output) data to the producer queue 1010, the producer queue 1010 is referred to as a producer queue with respect to the application thread. The producer consumer queues may be stored in memory, on disk, or any other storage. Some application threads may not include a producer queue and/or consumer queue. For example, if an application thread is directly obtaining data from a data store or from a network, then the application thread may not have a consumer queue. Likewise, if the application thread is storing data to a data store or network, then the application thread may not have a producer queue.

The duty cycle ownership object 1012 is a software object that is configured to track the duty cycle metrics for the application thread 1002. In one or more embodiments, the duty cycle ownership object is separate from the application thread. A duty cycle object is related to a single application thread 1002. Further, in one or more embodiments, an application thread is related to a single duty cycle object. The relationship is through an ownership claim. In one or more embodiments, each application thread in the thread set is related to a corresponding duty cycle object. Once ownership is claimed by the application thread 1012 for the duty cycle object, the duty cycle object is used to store, in an application thread specific stack, timestamps and current state of processing. The timestamps and current state are used to generate the duty cycle metric for the application thread. Storing timestamps and current state is described below with reference to FIG. 14. In some embodiments, rather than storing timestamps, stage changes are stored, and a weighted average is updated.

Figure 11:
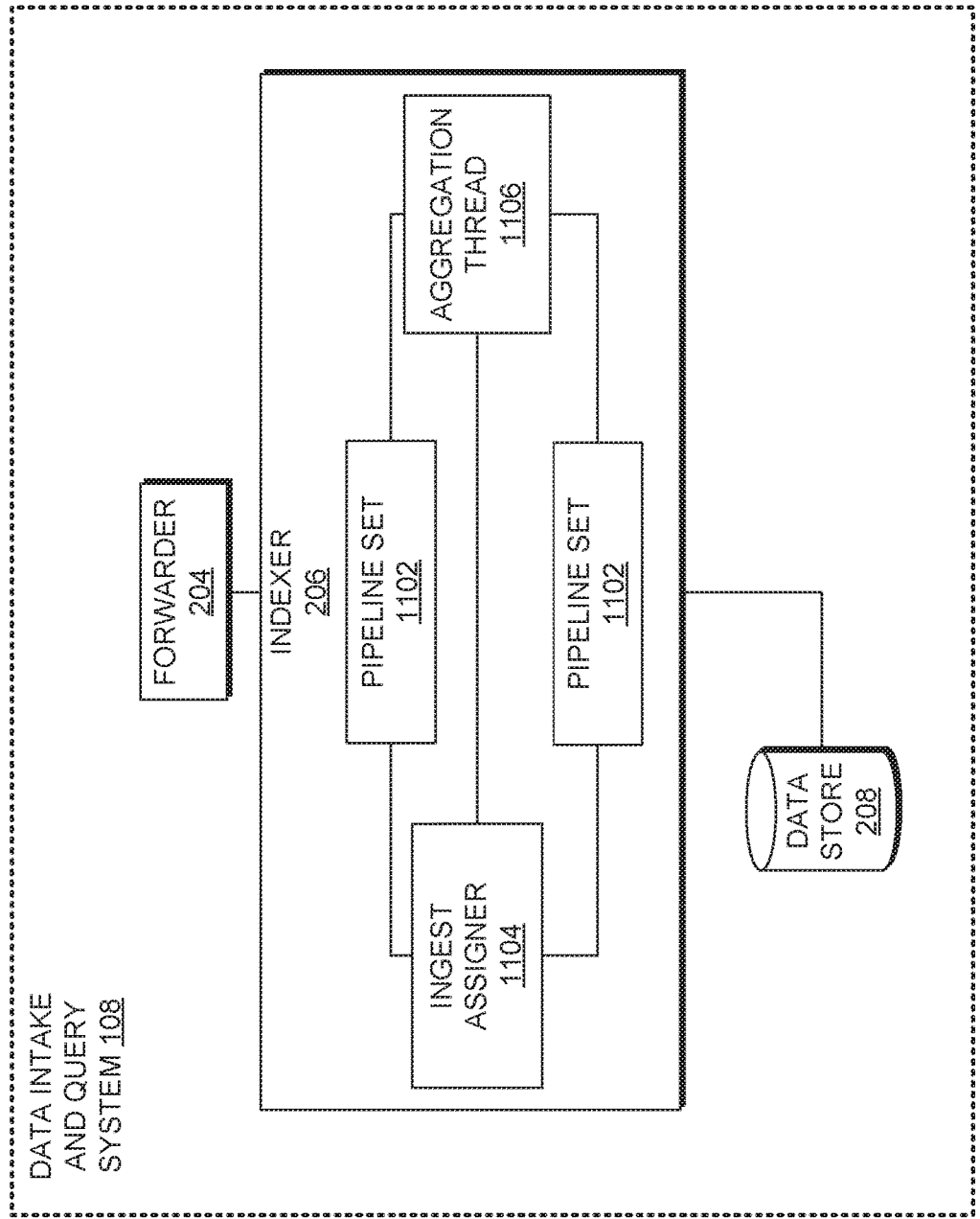
FIG. 11 illustrates a diagram of a data intake and query system for performing ingest in accordance with disclosed embodiments.

FIG. 11 illustrates a diagram of a data intake and query system for performing ingest in accordance with disclosed embodiments. Specifically, FIG. 11 shows a diagram for performing duty cycle based job assignment to assign ingest jobs in the data intake and query system 108 described above with reference to FIGS. 1 and 2. For the purposes of simplifying the description, any number of forwarders 204, indexers 206, and data stores 208 may exist. Embodiments are not limited to the configuration shown in FIG. 11.

Figure 12:
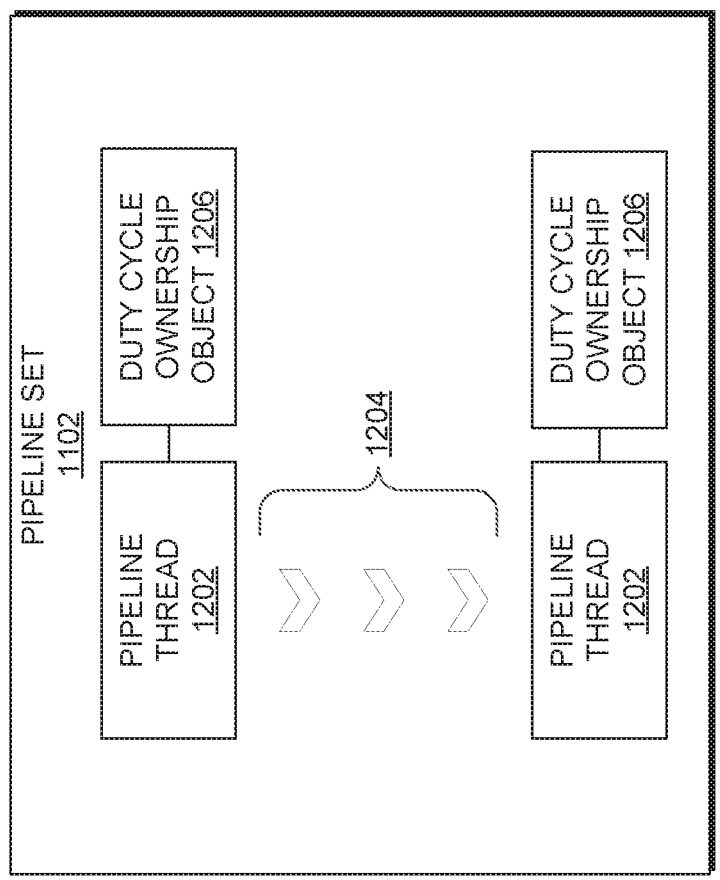
FIG. 12 illustrates a diagram of a pipeline set in accordance with disclosed embodiments.

An ingest job is a job to index and store incoming data from at least one data source (not shown) in a data store. In one or more embodiments, an ingest job is performed by pipeline sets on the indexers 206. In general, a pipeline set is a thread set (e.g., thread set 904 in FIG. 9) that executes a pipeline. Application threads are sequentially ordered in the pipeline, such that each application thread performs the operations of a portion of the pipeline before passing the data to the next application thread in the pipeline. Application threads in a pipeline set may be referred to as pipeline threads. FIG. 12 shows a pipeline set. An example of a pipeline set is described below with reference to FIG. 13. Although pipeline sets are described with respect to ingest requests, pipeline sets may be used for other operations, such as query processing.

Continuing with FIG. 11, an aggregation thread 1106 is a thread that is at least configured to aggregate the duty cycle metrics from the pipeline threads (i.e., pipeline thread duty cycle metrics) in the pipeline sets to generate duty cycle metrics for pipeline sets (i.e., pipeline set duty cycle metrics). The aggregation thread 1106 may perform the same functionality as aggregation thread 906 described with reference to FIG. 9. The ingest assigner 1104 is at least one thread that is configured to assign at least ingest jobs to pipeline sets 1102. The ingest assigner 1104 may perform the same functionality as described with respect to the assigner 908 described with reference to FIG. 9.

Although not shown in FIG. 11, a similar set of components of the indexer 206 in FIG. 11 may exist on other portions of the data intake and query system 108 to process requests. The operations to obtain duty cycle metrics and assign jobs may be the same on the other components as on the indexer 206. For example, the forwarder 204 may have multiple pipeline sets, an assigner and an aggregation thread. As described with reference to FIG. 2, the operations performed by the pipeline sets to process ingest requests is different on the forwarder 204 than on the indexer 206. The operations to obtain duty cycle metrics and assign jobs may be the same on the forwarder 204 as on the indexer 206.

Further, although not shown in FIG. 11, similar operations may be performed by a cluster master. A cluster master is software and/or hardware that is configured to manage a cluster of computing nodes. For example, a cluster master may manage virtual machines executing portions of the data intake and query system. The management by the cluster master may be to add and remove computing nodes, and to load balance jobs among the computing nodes. Aggregation threads (e.g., aggregation thread 1106) in the data intake and query system may report (i.e., through transmission or storage) the duty cycle metrics directly or indirectly to the cluster master. The cluster master may use the collected metrics to generate weights for indexers and forwarders would load balance incoming ingestion requests to the indexers based on the weights. If the indexers and forwarders all have low weights (i.e., indicating that the indexers and forwarders are loaded with jobs), the cluster master may add computing nodes. The cluster master may also remove computing nodes if the indexers and forwarders are not loaded with jobs.

FIG. 12 illustrates a diagram of a pipeline set 1102 in accordance with disclosed embodiments. As shown in FIG. 12, the pipeline set 1102 includes pipeline threads 1202. Each pipeline thread 1202 includes a discrete unit of work for the pipeline set 1102 before passing the data to the next pipeline thread. As designated by arrows 1204, more than two pipeline threads may exist, whereby the pipeline threads are ordered in sequential order. The sequential order may also be a consecutive order. Once a pipeline thread processes a data element, the pipeline thread does not process the data element or derivatives of the data element (i.e., the pipeline thread is not in multiple positions in the pipeline).

In one or more embodiments, each pipeline thread executes an individual pipeline. Each individual pipeline is a sequence of operations in which the performance of operation is dependent on a prior operation. As shown in FIG. 12, each pipeline thread 1102 is related to a unique duty cycle ownership object 1206. The duty cycle ownership object is the same or similar to the duty cycle ownership object 1012 described above with reference to FIG. 10.

Figure 13:
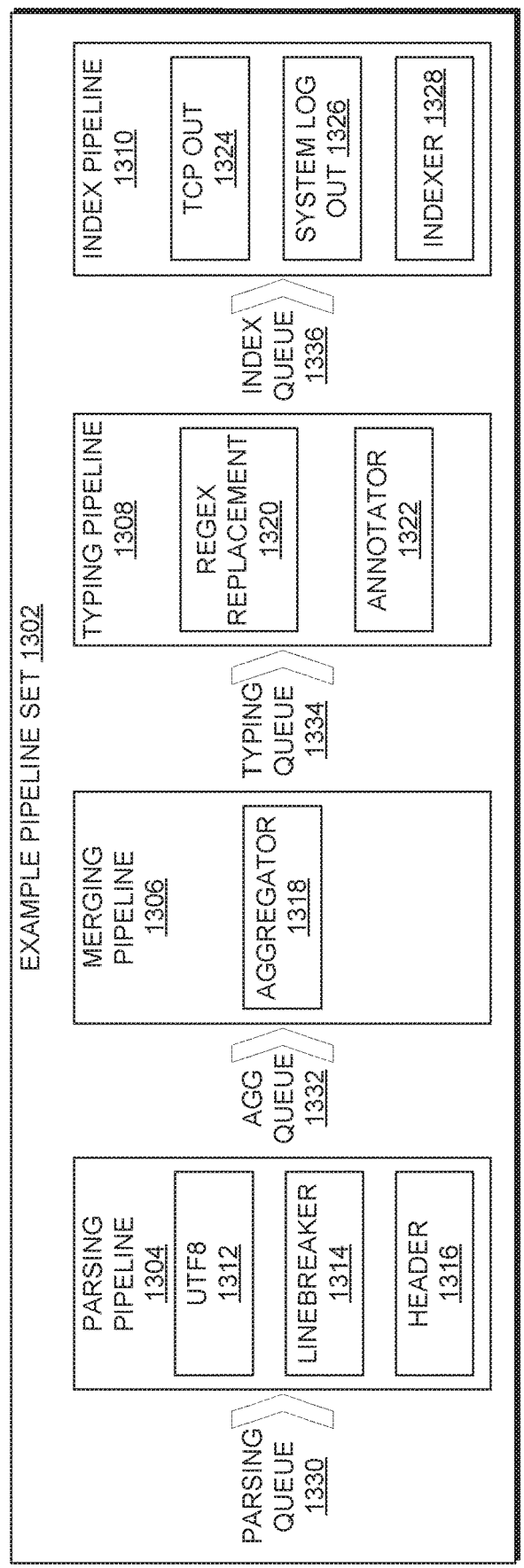
FIG. 13 illustrates a diagram of an example pipeline set having example pipelines in accordance with disclosed embodiments.

FIG. 13 illustrates a diagram of an example pipeline set 1302 having example pipelines (i.e., parsing pipeline 1304, merging pipeline 1306, typing pipeline 1308, and index pipeline 1310) to process incoming ingest requests in accordance with disclosed embodiments. Each pipeline (i.e., parsing pipeline 1304, merging pipeline 1306, typing pipeline 1308, and index pipeline 1310) has an individual and unique pipeline thread assigned to the pipeline. For example, the pipeline thread for the parsing pipeline 1304 performs UTF-8 (i.e., Unicode Transformation Format-8) operations 1312 to identify individual characters, line breaker analysis 1314 on the individual characters to identify individual lines, and header analysis 1316 to relate the lines to attributes. The pipeline thread for the merging pipeline 1306 may perform various aggregator operations. the pipeline thread for the typing pipeline 1308 performs regular expression (Regex) replacement operations 1320 and annotator operations 1322. The pipeline thread for the index pipeline 1310 performs transport control protocol (TCP) out operations 1324, system log out operations 1326 to write to a system log, and indexer operations 1328 to write to the index.

Continuing with the example, between the pipelines are producer consumer queues (i.e., parsing queue 1330, agg queue 1332, typing queue 1334, and index queue 1336) that provide a communication structure for pipeline threads to provide data to each other. The parsing queue 1330 is a producer queue for incoming data received by the example pipeline set 1302. The parsing queue 1330 is a consumer queue for the pipeline thread of the parsing pipeline 1304. The agg queue 1332 is a producing queue for the pipeline thread of the parsing pipeline 1304 and a consumer queue for the pipeline thread of the merging pipeline 1306. In other words, the parsing pipeline thread places data in the agg queue 1332, which is removed by the merging pipeline thread. The typing queue 1334 is a producing queue for the pipeline thread of the merging pipeline 1306 and a consumer queue for the pipeline thread of the typing pipeline 1308. Thus, the merging pipeline thread places data in the typing queue 1334, which is removed by the typing pipeline thread. The index queue 1336 is a producing queue for the pipeline thread of the typing pipeline 1308 and a consumer queue for the pipeline thread of the index pipeline 1310. Accordingly, the typing pipeline thread places data in the index queue 1336, which is removed by the index pipeline thread. Although not shown, the index pipeline thread may place data in a queue to be written to the data store.

Turning now to the flowcharts, the FIGS. 14-18 shows flowcharts for job load distribution based on duty cycle. The steps of FIGS. 14-18 may be performed using the various components of the system described above. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the disclosure.

Figure 14:
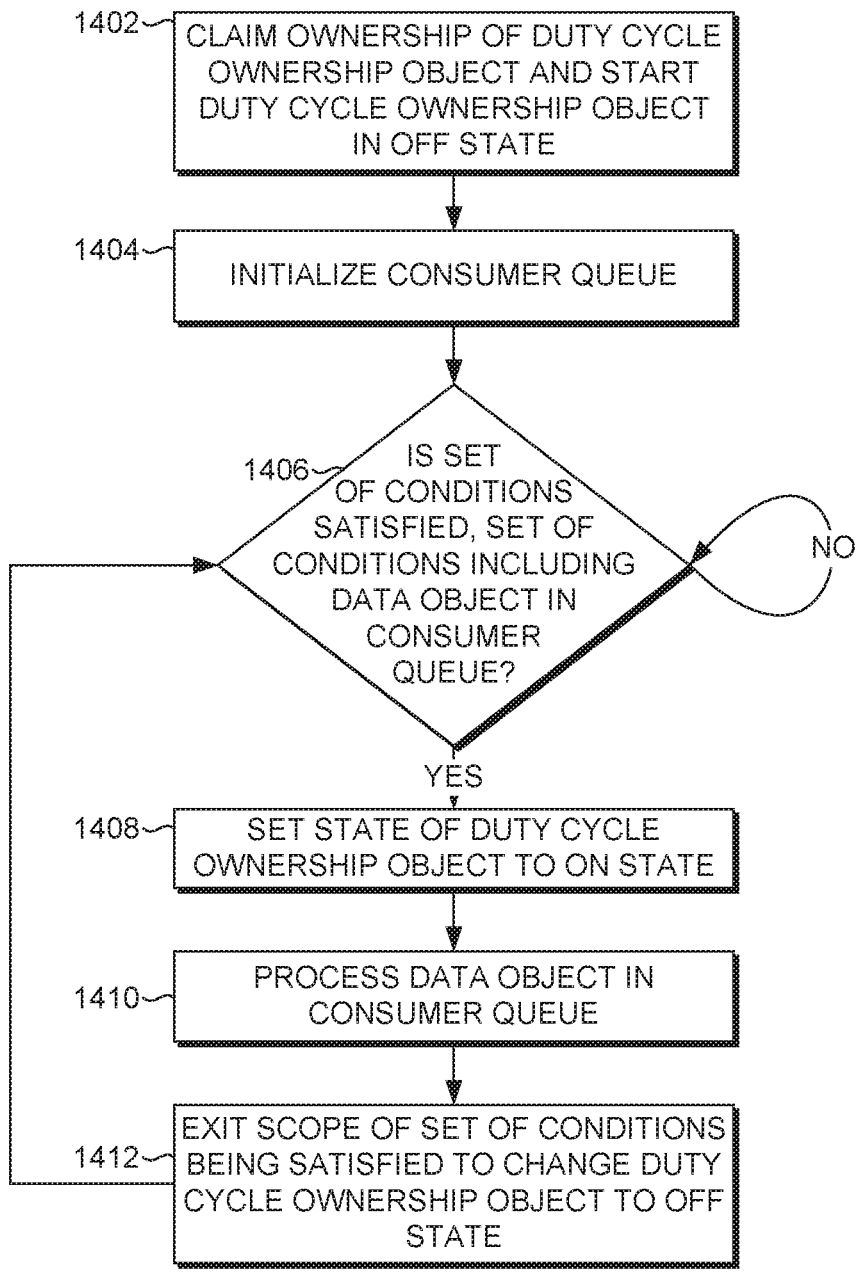
FIG. 14 illustrates a flowchart of an application thread generating a duty cycle metric in accordance with disclosed embodiments.

FIG. 14 illustrates a flowchart of an application thread generating a duty cycle metric in accordance with disclosed embodiments. At block 1402, an application thread claims ownership of the duty cycle ownership object and start the duty cycle ownership object in an off state. The duty cycle ownership object may be a software object existing in transient storage. The application thread may claim ownership of its per-thread duty cycle object thereby informing the system that this thread has been instrumented and is available for duty cycle metrics collection. When the application thread claims ownership of the duty cycle ownership object, the duty cycle metrics are in an off state. The state of the duty cycle ownership object indicates whether the application thread is currently actively processing data. The state may be an off state or an on state. In the off state, the conditions do not exist for the application thread to actively process data. As such, the application thread is deemed not currently busy for the purposes of determining duty cycle. In the on state, the conditions exist for the application thread to process data. Accordingly, the application thread is deemed currently busy for the purposes of determining duty cycle.

At Block 1404, the consumer queue of the application thread is initialized. For example, the consumer queue may be related to the application thread.

At Block 1406, a determination is made whether a set of conditions is satisfied. The set of conditions includes one or more conditions that all are satisfied for the set to be satisfied in one or more embodiments of the disclosure. The set of conditions includes that the application thread is able to actively process data. Specifically, actively processing data means that the application thread is not waiting, such as for another application thread or an event to occur. The set of conditions further include the application thread being assigned execution cycles. In one or more embodiments, the set of conditions include a data object being in the consumer queue of the application thread. If the data object is in the consumer queue, then the application thread has data to process. Testing whether the set of conditions is satisfied may be performed by an if statement executed by the application thread. If the set of conditions is not satisfied, then the application thread waits as shown by the no loop. The application thread waiting may be independent of whether execution cycles are assigned to the application thread. For example, the operating system may repetitively assign execution cycles to the application thread even when the application thread does not have data to process. The execution cycles may be used just to test whether the application thread has data to process. Because execution cycles are assigned to a waiting thread at least to test whether data exists, measuring execution cycles is not a measurement of duty cycle.

At Block 1408, if the set of conditions is satisfied, the state of the duty cycle ownership object is set to the on state. In one or more embodiments, the on state is set in an execution stack for the application thread. In one or more embodiments, a timestamp is recorded. In one or more embodiments, the setting of the duty cycle ownership object to the on state is scoped to the conditional statement testing whether the set of conditions is satisfied. For example, the timestamp may be recorded in the execution stack at the location of the conditional statement. Further, instructions may be added to the execution stack such that at the end of the conditional statement, the duty cycle ownership object is switched to an off state.

At Block 1410, the application thread processes the data object in the consumer queue. Specifically, the application thread actively executes the operations of the application thread to process data. If the application thread is a pipeline thread, then the pipeline thread performs the portion of the pipeline assigned to the pipeline thread.

At Block 1412, the scope of the set of conditions being satisfied is exited changing the duty cycle ownership object to an off state. At the end of the execution, the duty cycle ownership object is changed to an off state. A timestamp is obtained for the change at the end of the scope.

In some embodiments, the timestamp may be explicitly or implicitly related in storage to the transition to off state. In such embodiments, the aggregation thread aggregates the amount of time that the duty cycle ownership object is in an on state based on multiple timestamps in a period.

In some embodiments, the application thread calculates the difference between the timestamp obtained as part of Block 1404 and a current timestamp when the duty cycle ownership object is switched to an off state. The application thread may record the difference for the aggregation thread. At the end of the period, the aggregation thread may calculate a total of the time that the duty cycle ownership object is in an on state from the set of differences for a period. As another example, the application thread may record a running total of the difference for the aggregation thread by summing the current calculated difference between timestamps with a previous total. The aggregation thread may use the single running total to obtain the duty cycle metric.

Figure 15:
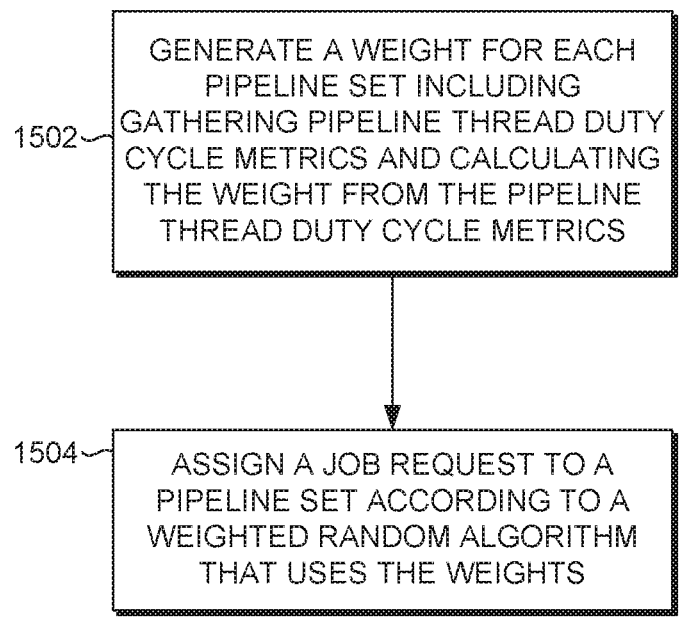
FIG. 15 illustrates a flowchart of assigning jobs to pipeline sets based on duty cycle metrics in accordance with disclosed embodiments.

As described in FIG. 14, the application thread stores data from which the duty cycle metric may be derived for a period. At the end of a period or a collection of periods, weights may be reassigned to assign jobs. FIG. 15 illustrates a flowchart of assigning jobs to pipeline sets based on duty cycle metrics in accordance with disclosed embodiments. While FIGS. 15-18 are described with reference to pipeline sets, the same or similar techniques may be performed for assigning jobs to other types of thread sets.

Initially, jobs are assigned with each pipeline set having equal weights. For example, weighted round robin may be used, or a weighted random distribution may be used, whereby the weights are the same across pipeline threads.

At Block 1502, a weight for each pipeline set is generated. The aggregation thread generates the weight in one or more embodiments. Generating the weight includes gathering pipeline thread duty cycle metrics and calculating the weight from the pipeline thread duty cycle metrics. In one or more embodiments, the aggregation thread obtains the data, described above with reference to FIG. 14, stored by the pipeline thread from which the pipeline thread duty cycle metric may be determined. For a pipeline set, the aggregation thread may combine the pipeline thread duty cycle metrics of pipeline threads in the pipeline set to generate a pipeline set duty cycle metric. The aggregation thread may use the pipeline set duty cycle metric to generate the weight for the pipeline set.

At Block 1504, a job is assigned to a pipeline set according to a weighted random algorithm that uses the assigned weights. In one or more embodiments, Vose's alias method is used to generate a list having the weighted random distribution of selecting pipeline sets. The assigner or a different thread may use Vose's alias method. When a job is received for assignment, the assigner may select a next pipeline set in the list to obtain the selected pipeline set. The assigner assigns the job request to the selected pipeline set. As another example, applying the weighted random distribution may be performed on demand as new job requests are received.

Assigning a job to a pipeline set may be performed by performing one or more of the following operations. In storage, a pipeline set identifier of a selected pipeline set may be related to a job identifier of the job. An event may be issued to the selected pipeline set with the job identifier of the job. The job identifier may be stored a job queue of the selected pipeline set, whereby the job queue is accessed by the selected pipeline set. The job may be transmitted to the selected pipeline set.

Figure 16:
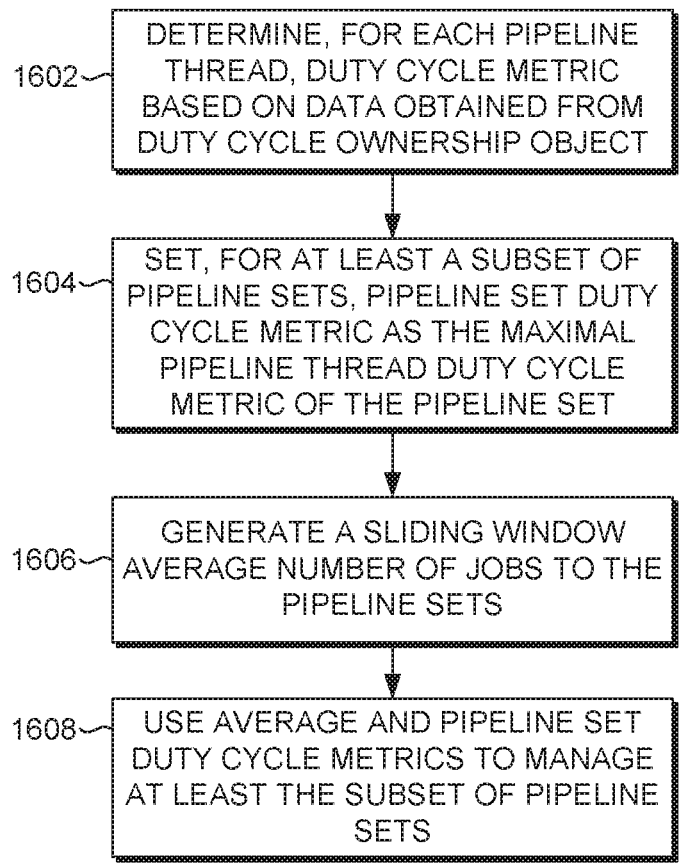
FIG. 16 illustrates a flowchart of gathering a duty cycle metric in accordance with disclosed embodiments.

FIG. 16 illustrates a flowchart of gathering duty cycle metrics in accordance with disclosed embodiments. In particular, FIG. 16 provides an example technique for performing Step 1502 of FIG. 15. At Block 1602, for each pipeline thread, a duty cycle metric is determined based on data obtained from the duty cycle ownership object. The duty cycle metric is a measure of the percentage of time that the duty cycle ownership object is in an on state as compared to an off state. Rather than being a percentage, the duty cycle metric may be a total. Because the length of the period is the same across pipeline sets, the amount of time that the pipeline set duty cycle metric is an off state and the length of the period may be ignored when calculating the weight.

In embodiments in which the application thread stores a collection of timestamps, at the end of the period, the aggregation thread may determine the amount of time that the duty cycle ownership object is in the on state as compared to the off state by calculating the differences between consecutive timestamps. The aggregation thread may generate a weighted moving average for the period based on the differences in time. The weighted moving average may have different weights within the period and/or between periods. For example, within a period, the weighted moving average gives greater weight to the state of the latest transitions and corresponding timestamps in the period. In some embodiments, the weighted moving average is weighted between periods. For example, the total time that the duty cycle ownership object is in the on state (e.g., based on the differences between consecutive time may be calculated for the period and divided by the length of the period.

In embodiments in which the application thread determines the amount of time that the duty cycle metric is in the on state and stores the amount or amounts, the aggregation thread may use the amount to calculate the pipeline thread duty cycle metric. Specifically, the aggregation thread may obtain the amounts from storage of the application thread. The aggregation thread may use the difference or differences calculated by the application thread to calculate the weighted moving average, as described above. The weighted moving average is the pipeline set duty cycle metric in accordance with one or more embodiments.

Thus, the result of Block 1602 is a pipeline thread duty cycle metric.

At Block 1604, for at least a subset of the pipeline sets, the pipeline set duty cycle metric is set as the maximal pipeline thread duty cycle metric of the pipeline set. In a pipeline set, the pipeline thread duty cycle metrics are obtained and compared with each other. The pipeline thread duty cycle metric having the maximal value is selected as the pipeline set duty cycle metric. The process is repeated for each pipeline set in at least the subset.

Although Block 1604 describes using a maximal pipeline thread duty cycle metric as the pipeline set duty cycle metric, other statistic may be used. For example, the average, the median, or a different measure across the pipeline thread duty cycle metrics for a pipeline set may be used.

Continuing with FIG. 16, at Block 1606, a sliding window average number of jobs to the pipeline sets is generated. A sliding window average is an average of the current period and the previous N periods, where N is a set number. One technique for generating the average number of jobs is to multiply the previous period computed average number of jobs by ((N−1)/N) to obtain a first intermediate value, multiply the current period number of jobs by (1/N) to obtain a second intermediate value, and add the first intermediate value to the second intermediate value. Other techniques for generating the average number of jobs may be used without departing from the scope of the disclosure.

At Block 1608, the average and the pipeline set duty cycle metrics are used to manage at least the subset of pipeline sets. In one or more embodiments, based on the average number of jobs and the pipeline set duty cycle metrics, weights are generated for the pipeline sets. The average number of jobs is used to determine whether to apply equal weights or whether to vary the weights between pipeline sets. The pipeline set duty cycle metrics are used to determine the relative workload of the pipeline thread sets as compared to other pipeline thread sets. Based on the relative workload, weights may be determined in which the weights are inversely assigned to the workload. The greater the workload, the lower the weight. An example for generating the pipeline set weights using the average and the pipeline set duty cycle metrics are described below with reference to FIG. 17.

Figure 17:
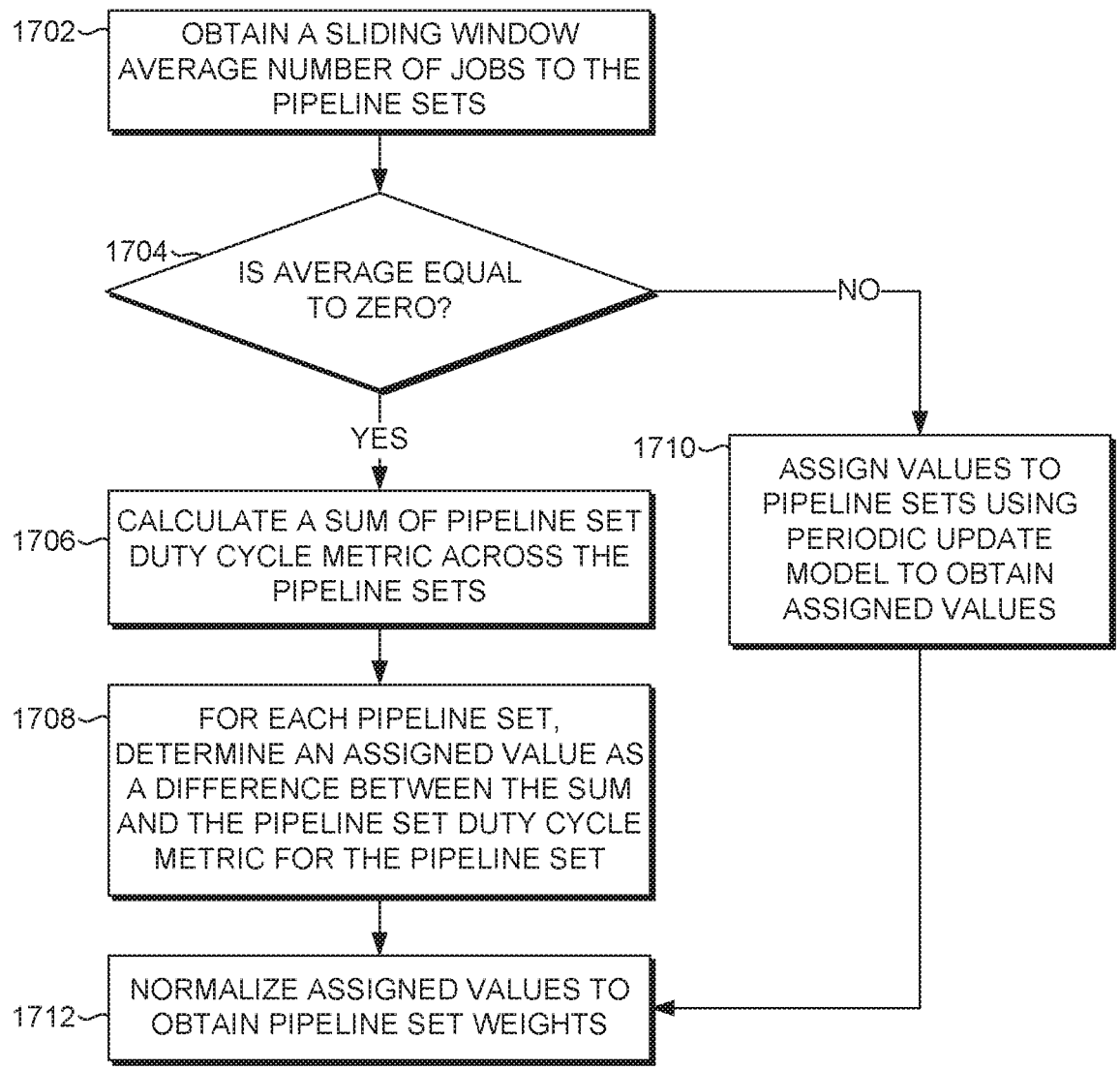
FIG. 17 illustrates a flowchart of generating pipeline set weights in accordance with disclosed embodiments.

FIG. 17 illustrates a flowchart of generating pipeline set weights in accordance with disclosed embodiments. At Block 1702, the sliding window average number of jobs to the pipeline thread sets is obtained. The sliding window average number of jobs is obtained as described above with reference to FIG. 16. At Block 1704, a determination is made whether the average number of jobs is equal to zero. If the average number of jobs is equal to zero, then a determination is made that insufficient number of jobs exist, then the weights are assigned based only on the current period load metrics. Specifically, at Block 1706, the sum of the pipeline set duty cycle metrics is calculated across the pipeline sets. In other words, for the pipeline sets to which a job may be assigned, the pipeline set duty cycle metrics are totaled.

At Block 1708, for each pipeline set, an assigned value is determined as a difference between the sum and the pipeline set duty cycle metric for the pipeline set. For a pipeline set, the difference between the sum determined at Block 1704 and the pipeline set duty cycle metric of the pipeline set is calculated. The difference is the assigned value to the pipeline set. Obtaining the difference is performed for each pipeline set.

Returning to Block 1704, if the average number of jobs is greater than zero, then the flow proceeds to Block 1710. At Block 1710, a periodic update model is used to assign assigned values to the pipeline sets. The periodic update model considers the current period as well as previous periods when assigning values. An example technique for applying the periodic update model is described below with reference to FIG. 18.

Returning to FIG. 17, the assigned values are normalized to obtain pipeline set weights. In one or more embodiments, normalizing the assigned values is transforming the assigned values to a scale, such as between zero and one, inclusive. For example, the assigned values may be summed to obtain a summation. The assigned value of a pipeline set may be divided by the summation to obtain the corresponding weight for the pipeline set.

Figure 18:
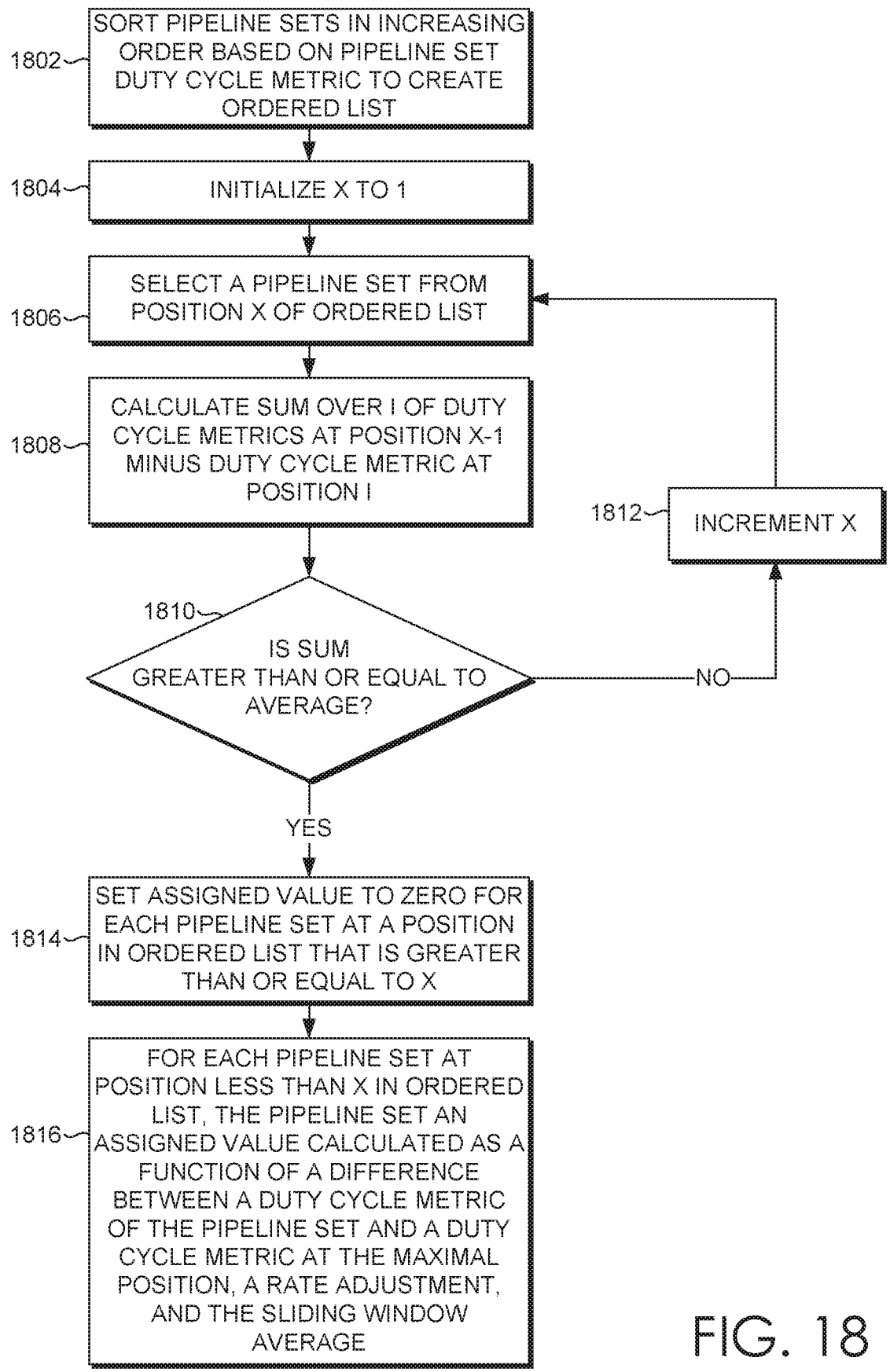
FIG. 18 illustrates a flowchart of using a periodic update model to generate pipeline set weights in accordance with disclosed embodiments.

FIG. 18 illustrates a flowchart of using a periodic update model to generate pipeline set weights in accordance with disclosed embodiments. In one or more embodiments, FIG. 18 describes a modified version of Dahlin's model to generate the pipeline set weights.

At Block 1802, pipeline sets are ordered in increasing based on the pipeline set duty cycle metrics to obtain ordered list. In the order, the pipeline set having the lowest pipeline set duty cycle metric is at the starting position in the ordered list and the pipeline set having the greatest pipeline set duty cycle metric is last. The remaining pipeline sets are added to the ordered list so as to be in monotonically increasing order of the pipeline sets' corresponding pipeline set duty cycle metrics. Thus, pipeline sets are ordered according to their respective workloads, such that the pipeline set having the greatest workload is last.

At Block 1804, an incrementor variable X is initialized to one. X is used to mark a current position within the ordered list. Initially, is set to the starting position in the ordered list.

At Block 1806, a pipeline set is selected from position X of the ordered list. The sum over i, from i at starting position to i at position X−1, of the pipeline set duty cycle metric at position X−1 minus pipeline set duty cycle metric at position i is calculated at Block 1808. For example, if X is 5, then the sum of differences between pipeline set duty cycle metrics at position 4 and positions 0-4 is calculated. At Block 1810, a determination is made whether the sum is greater than or equal to the average number of jobs. If the sum is not greater than or equal to the average, the flow proceeds to Block 1812, whereby X is incremented by 1 and the process repeats starting with Block 1806.

Blocks 1806-1810 may be performed by calculating the following Equation (Eq. 1) below.

$$\sum_{i=0}^{X-1} (DutyCycleShare_{X-1} - DutyCycleShare_i) < \text{average\_injection\_rate} \quad \text{(Eq. 1)}$$

In Equation (Eq. 1), i is an incrementor, the DutyCycleShare$_{X-z}$, is the duty cycle metric of the pipeline set at position X−1, and DutyCycleShare$_i$ is the duty cycle metric of the pipeline set at position i. Average_injection_rate is the average number of jobs assigned for the last N periods.

If the sum is greater than or equal to the average, the flow proceeds to Block 1814. At Block 1814, the assigned value is set to zero for each pipeline set at a position in the ordered list that is greater than or equal to X. In other words, for any pipeline set with a greater pipeline set duty cycle metric than the pipeline set at position X, the assigned value and correspondingly the weight, may be zero.

At Block 1816, for each pipeline set at position less than X in ordered list, the pipeline set is assigned an assigned value calculated as a function of a difference between a duty cycle metric of the pipeline set and a duty cycle metric at the maximal position (i.e., position X), a rate adjustment, and the sliding window average. The rate adjustment accounts for the average number of jobs of the pipeline set for the past N periods. In one or more embodiments, the assigned values may be calculated using Equations (Eq. 2), (Eq. 3), and (Eq. 4) below.

$$Pi = \frac{\text{share} + \text{arrival\_rate\_adjustment}}{\text{average injection rate}} \text{ for } i < X \quad \text{(Eq. 2)}$$

$$\text{share} = DutyCycleShare_X - DutyCycleShare_i \quad \text{(Eq. 3)}$$

$$\text{arrival\_rate\_adjustment} = \frac{\text{average\_injection\_rate} - \sum_{j=0}^{X-1} DC_{X-1} - DC_j}{\text{average\_injection\_rate}} \quad \text{(Eq. 4)}$$

In Equations (Eq. 2), (Eq. 3), and (Eq. 4), P$_i$ is the assigned value of the pipeline set at position i in the ordered list. The DutyCycleShare$_X$ is the duty cycle metric of the pipeline set at position X, and DutyCycleShare$_i$ is the duty cycle metric of the pipeline set at position i. Arrival rate adjustment is the rate adjustment. The arrival rate adjustment is a function of the average injection rate (e.g., the average number of jobs assigned for the last N periods). The average injection rate may be the value calculated above in Block 1606 of FIG. 16. $DC_{X-1}$ is the duty cycle metric at position X−1, DC, is the duty cycle metric at position j, where j is an incrementing variable.

By way of an example of FIG. 18, consider the scenario in which the duty cycle metrics are 0.1, 0.1, 0.1, 1 and average ingestion rate is 2. In the example, X is 4 because 1−0.1+1−0.1+1−0.1=2.7 and 2.7>2. The weights are 33.34, 33.33, 33.33, 0. Thus, the load may be distributed on the pipeline sets that are very lightly loaded (i.e., the first three pipeline sets in the list) in the next period.

While the above is one set of equations for assigning values to a pipeline set, other equations may also be used without departing from the scope of the disclosure.

Figure 19:
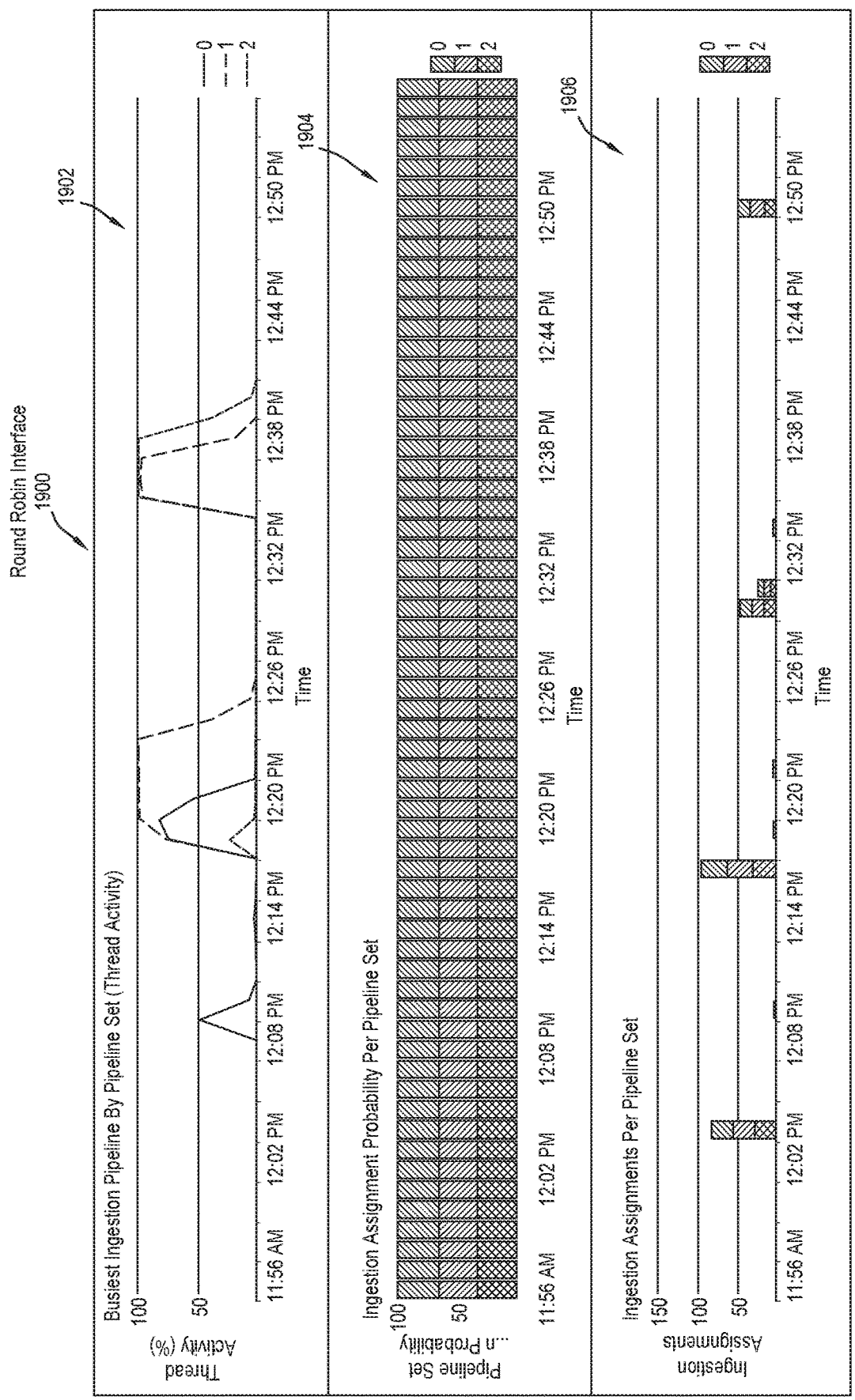
FIG. 19 illustrates an example interface in accordance with one or more embodiments of the invention.
Figure 20:
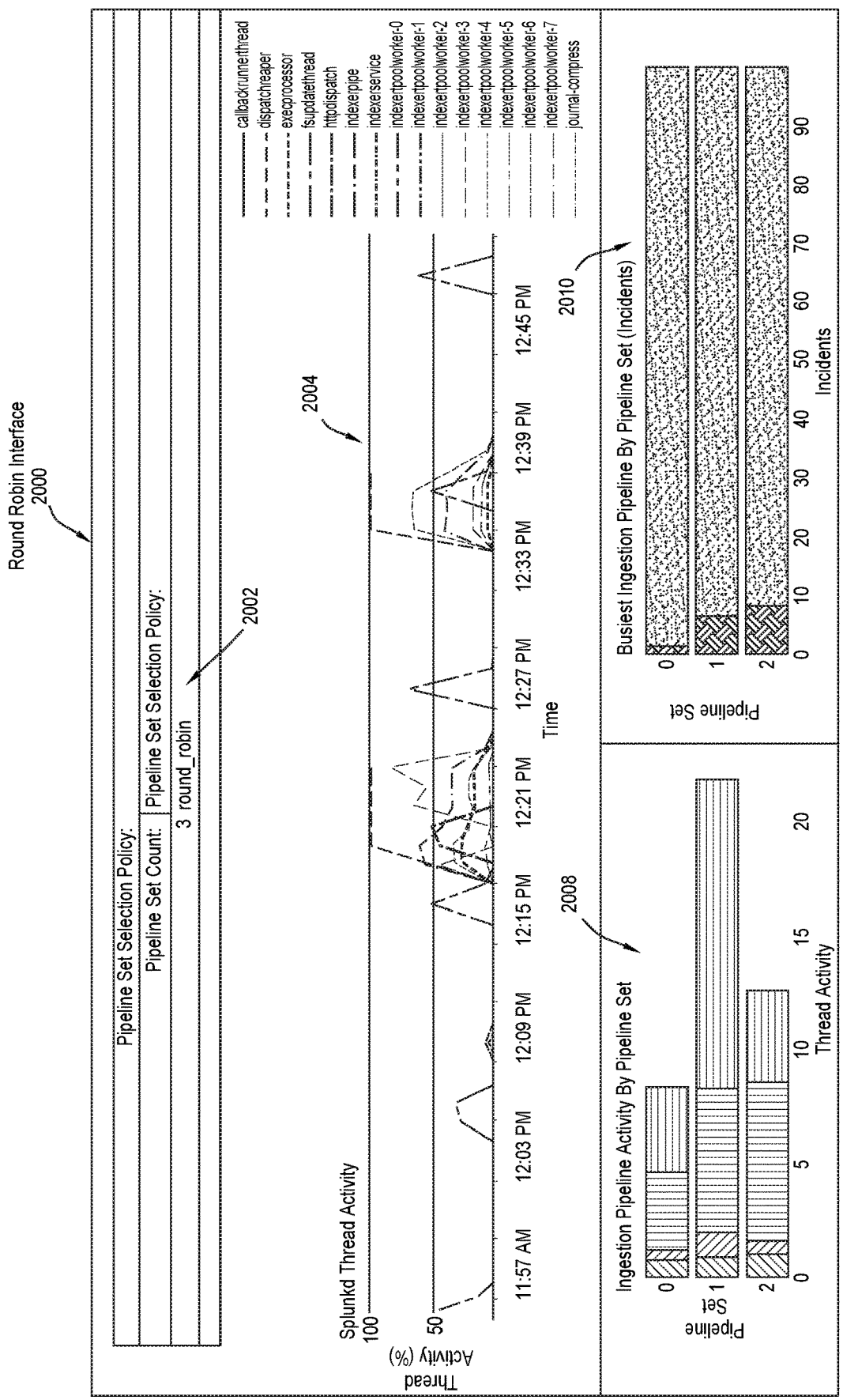
FIG. 20 illustrates an example interface in accordance with one or more embodiments of the invention.
Figure 21:
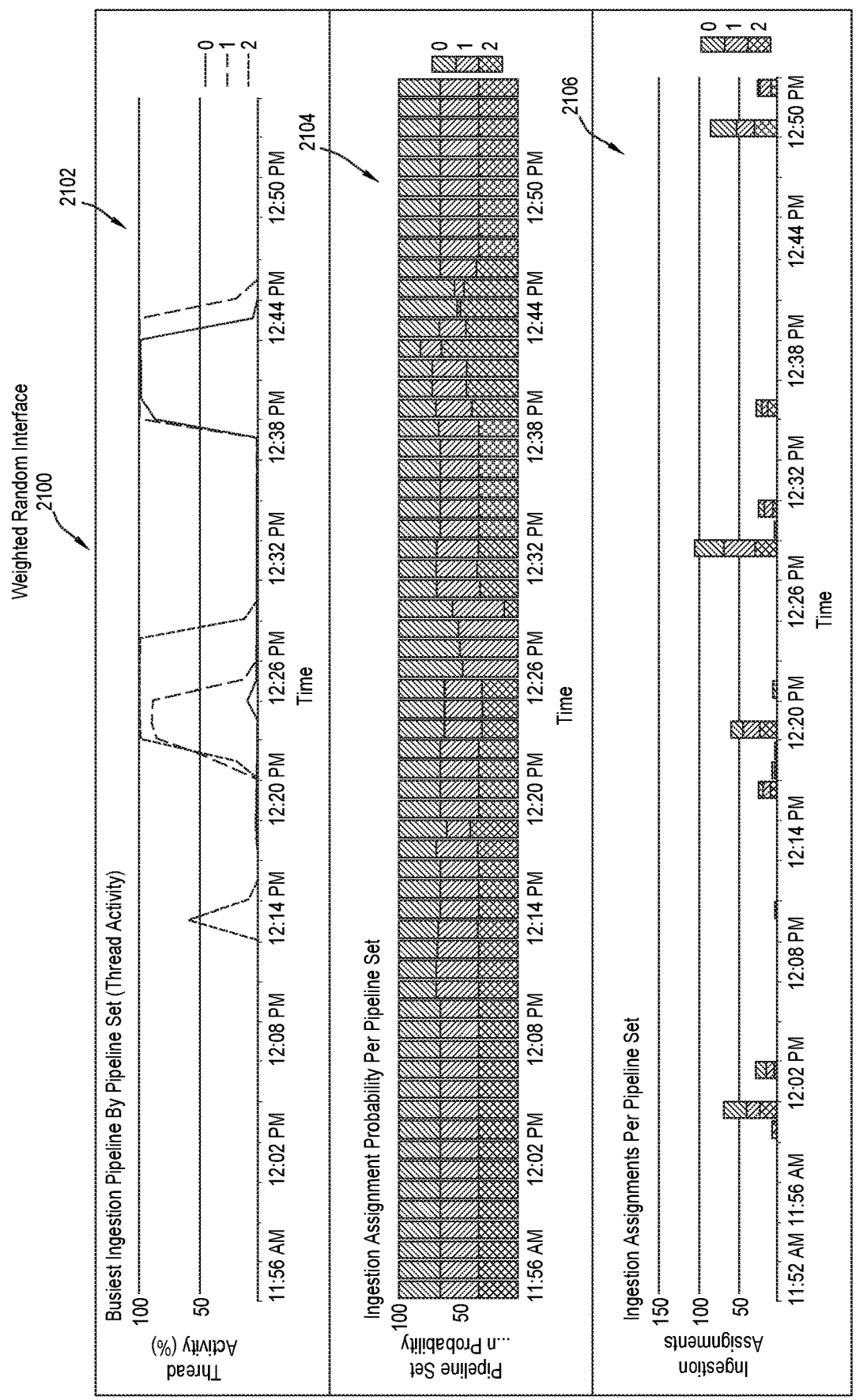
FIG. 21 illustrates an example interface in accordance with one or more embodiments of the invention.

As described above, the duty cycle metrics may be used to assign pipeline sets to jobs. Application administrators may view metrics gathered through the application and regarding the assignment of jobs and configure the aggregator and assigner. In some embodiments, the application may be configurable to switch between using weighted round robin and weighted random distribution using duty cycle metrics. FIGS. 19 and 20 illustrates an example administer interface showing weighted round robin being implemented. FIGS. 20 and 21 illustrate the example interface showing weighted random distribution being implemented. In the example, three pipeline sets are shown. The pipeline sets are pipeline set 0, pipeline set 1 and pipeline set 2 (denoted as 0, 1, and 2 in the example interface Figures).

FIG. 19 illustrates an example round robin interface 1900 in accordance with one or more embodiments of the invention. Graph 1902 is a time series graph of thread activity. Specifically, graph 1902 shows the busiest pipeline by pipeline set. The graph shows the maximum pipeline thread activity of the busiest ingestion pipeline grouped by pipeline set. The busiest ingestion pipeline corresponds to the ingestion pipeline with the highest thread activity during the measurement period. The horizontal axis is time and the vertical axis is the pipeline set duty cycle metric. In other words, for the pipeline thread having the maximal duty cycle metric in the corresponding pipeline set, the vertical axis shows the pipeline thread activity (e.g., the percentage of maximum workload of the pipeline thread being used at the moment in time).

Graph 1904 is a time series graph of assignment values. In other words, graph 1904 is the ingestion assignment probability per pipeline set. The graph shows the relative pipeline set selection probably for new ingestion assignment requests. The probability is a factor of the pipeline set selection policy shown in the indexing overview chart. The vertical axis represents the distribution of the probability of selecting a particular pipeline set. The horizontal axis is over time. As shown by the equal size blocks for pipeline sets 0, 1, and 2 over time, the round robin used assigns equal weights to each pipeline set. As such, the Graph 1904 remains the same over time.

Graph 1906 is a time series graph of ingestion assignments. Specifically, graph 1906 is the ingestion assignments per pipeline set. The graph shows the number of ingestion assignments grouped by pipeline set. The ingestion assignments correspond to each new ingestion connection request to the indexer. Again, the horizontal axis is time and the vertical axis is the total number of ingestion assignments. Along the vertical axis, pipeline sets are color encoded to show the percentage of the total number for each pipeline set. Again, because round robin is used, jobs are equally distributed to each pipeline set.

Next, comparing Graph 1902 with Graph 1906, even though jobs were equally distributed to pipeline sets, the pipeline sets did not have equal distribution of work. For example, pipeline set 1 had a greater duty cycle measurement between time 12:18 and 12:26, than pipeline set 0 and 2. Thus, the equitable distribution of jobs does not result in an equitable distribution of processing.

FIG. 20 illustrates an example interface 2000 when round robin is selected in 2002 in accordance with one or more embodiments of the invention. Graph 2004 shows a time series graph of the duty cycle metric on a per pipeline thread basis. Specifically, Graph 2004 shows the average thread activity of the threads. Each thread is represented by a different line on the graph. Graph 2008 shows the average pipeline thread duty cycle metric grouped by pipeline set. In other words, the horizontal axis is the duty cycle metric. The vertical axis is the pipeline set. Within the pipeline set, twelve pipeline threads are shown. The twelve pipeline threads show the percentage of the total activity is from each of the twelve respective pipeline threads. As shown, the pipeline threads may not have proportional activity to the number of jobs or the percentage of the total activity.

Graph 2010 shows the busiest ingestion pipeline per pipeline set. Specifically, Graph 2010 shows the count of the busiest ingestion pipeline incidents grouped by pipeline set. The busiest ingestion pipeline corresponds to the ingestion pipeline with the highest thread activity during the measurement period.

Figure 22:
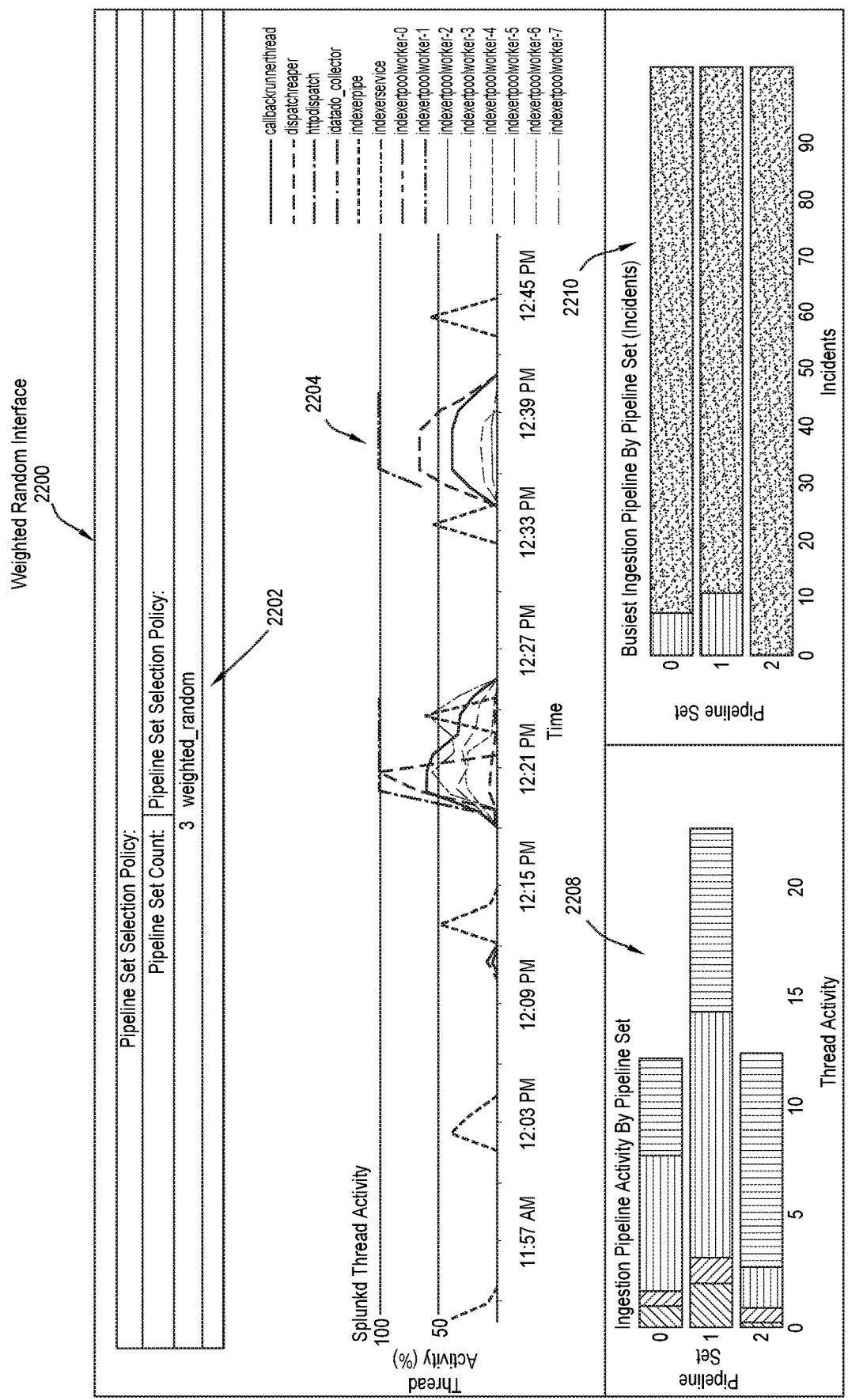
FIG. 22 illustrates an example interface in accordance with one or more embodiments of the invention.

FIG. 21 and FIG. 22 illustrate similar interfaces as FIG. 19 and FIG. 20, but using weighted random distribution. FIG. 21 illustrates an example interface in accordance with one or more embodiments of the invention. Graph 2102 is a time series graph of thread activity. Specifically, graph 2102 shows the busiest pipeline by pipeline set. The graph shows the maximum pipeline thread activity of the busiest ingestion pipeline grouped by pipeline set. The busiest ingestion pipeline corresponds to the ingestion pipeline with the highest thread activity during the measurement period. The horizontal axis is time and the vertical axis is the pipeline set duty cycle metric. In other words, for the pipeline thread having the maximal duty cycle metric in the corresponding pipeline set, the vertical axis shows the pipeline thread activity (e.g., the percentage of maximum workload of the pipeline thread being used at the moment in time).

Graph 2104 is a time series graph of assignment values. In other words, graph 1904 is the ingestion assignment probability per pipeline set. The graph shows the relative pipeline set selection probably for new ingestion assignment requests. The probability is a factor of the pipeline set selection policy shown in the indexing overview chart. The vertical axis represents the distribution of the probability of selecting a particular pipeline set. The horizontal axis is over time. As shown by the variable size blocks for pipeline sets 0, 1, and 2 over time, the weighted random distribution assigns unequal weights to each pipeline set. Thus, when a pipeline set duty cycle metric indicates a pipeline set is busy, the weight of the pipeline set is reduced. The resulting changes is shown by a comparison of Graph 2102 with the Graph 2104. Thus, as shown in Graph 2104, when pipeline set 1 is busy at time 12:41 in Graph 2102, the weight is reduced.

Graph 2106 is a time series graph of ingestion assignments. Specifically, graph 2106 is the ingestion assignments per pipeline set. The graph shows the number of ingestion assignments grouped by pipeline set. The ingestion assignments correspond to each new ingestion connection request to the indexer. Again, the horizontal axis is time and the vertical axis is the total number of ingestion assignments. Along the vertical axis, pipeline sets are color encoded to show the percentage of the total number for each pipeline set. Because different weights are assigned, the distributions of jobs are not equal.

FIG. 22 illustrates an example interface 2200 in accordance with one or more embodiments of the invention. when round robin is selected in 2202 in accordance with one or more embodiments of the invention. Graph 2204 shows a time series graph of the duty cycle metric on a per pipeline thread basis. Specifically, Graph 2204 shows the average thread activity of the threads. Each thread is represented by a different line on the graph. Graph 2208 shows the average pipeline thread duty cycle metric grouped by pipeline set. In other words, the horizontal axis is the duty cycle metric. The vertical axis is the pipeline set. Within the pipeline set, twelve pipeline threads are shown. The twelve pipeline threads show the percentage of the total activity is from each of the twelve respective pipeline threads. As shown, the pipeline threads may not have proportional activity to the number of jobs or the percentage of the total activity.

Graph 2210 shows the busiest ingestion pipeline per pipeline set. Specifically, Graph 2210 shows the count of the busiest ingestion pipeline incidents grouped by pipeline set. The busiest ingestion pipeline corresponds to the ingestion pipeline with the highest thread activity during the measurement period.

4.0 Hardware

The various components of the figures may be a computing system or implemented on a computing system. For example, the operations of the data stores, indexers, search heads, host device(s), client devices, data intake and query systems, data sources, external resources, and/or any other component shown and/or described above may be performed by a computing system. A computing system may include any combination of mobile, desktop, server, router, switch, embedded device, or other types of hardware. For example, the computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. The computer processor(s) may be an integrated circuit for processing instructions. For example, the computer processor(s) may be one or more cores or micro-cores of a processor. The computing system may also include one or more input devices, such as a touchscreen, keyboard, mouse, microphone, touchpad, electronic pen, or any other type of input device.

The computing system may be connected to or be a part of a network. For example, the network may include multiple nodes. Each node may correspond to a computing system, such as the computing system, or a group of nodes combined may correspond to the computing system. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system may be located at a remote location and connected to the other elements over a network.

The node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes in the network may be configured to provide services for a client device. For example, the nodes may be part of a cloud computing system. The nodes may include functionality to receive requests from the client device and transmit responses to the client device. The client device may be a computing system. Further, the client device may include and/or perform all or a portion of one or more embodiments of the disclosure.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the above figures show various configurations of components, other configurations may be used without departing from the scope of the disclosure. For example, various components may be combined to create a single component. As another example, the functionality performed by a single component may be performed by two or more components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method for assigning executable jobs to pipeline sets comprising:
generating a weight for each pipeline set of a plurality of pipeline sets to obtain a plurality of weights, wherein generating the weight for a pipeline set comprises:
obtaining a plurality of duty cycle metrics for a plurality of pipeline threads in the pipeline set,
wherein the plurality of duty cycle metrics comprises a measure of an amount of time that a corresponding pipeline thread is executing and actively processing data,
wherein obtaining a duty cycle metric comprises:
assigning a duty cycle ownership object to a thread, and
when a set of conditions is satisfied,
setting the duty cycle ownership object to an on state, and
processing a data object in a consumer queue while the duty cycle ownership object is in the on state,
wherein the set of conditions comprises the data object existing in the consumer queue of the thread, and
determining the weight for the pipeline set based at least in part on the plurality of duty cycle metrics; and assigning a job request to a target pipeline set selected, using the plurality of weights, from the plurality of pipeline sets.

2. The computer implemented method of claim 1, wherein generating the weight further comprises:
determining an average number of data ingestion tasks assigned to the plurality of pipeline sets, wherein determining the weight is based on the average number of data ingestion tasks.

3. The computer implemented method of claim 1,
wherein the duty cycle ownership object is switched to an off state after processing the data object, and
wherein obtaining the duty cycle metric further comprises keeping the duty cycle ownership object in the off state when the consumer queue is empty.

4. The computer implemented method of claim 1,
wherein the duty cycle ownership object is set to the on state within a scope defined by determining that the set of conditions are satisfied,
wherein the data object is processed in the consumer queue while within the scope, and
wherein obtaining the duty cycle metric further comprises exiting the scope to switch the duty cycle ownership object to an off state.

5. The computer implemented method of claim 1, wherein obtaining a duty cycle metric comprises:
reading a plurality of timestamps and state information from the duty cycle ownership object, and
generating, as the duty cycle metric, a weighted moving average using the plurality of timestamps and the state information.

6. The computer implemented method of claim 1, wherein generating the weight comprises:
setting, for at least a subset of the plurality of pipeline sets, a pipeline set duty cycle metric as a maximal duty cycle metric of the plurality of pipeline threads in the pipeline set,
generating a sliding window average of incoming jobs to the plurality of pipeline sets, and
using the sliding window average and a thread set duty cycle metric to determine the weight for the pipeline set.

7. The computer implemented method of claim 1, wherein generating the weight comprises:
determining, for the pipeline set, a pipeline set duty cycle metric from the plurality of duty cycle metrics,
generating a sliding window average of incoming jobs to the plurality of pipeline sets, and
when the sliding window average is equal to zero,
calculating a sum of the pipeline set duty cycle metric across the plurality of pipeline sets, and
determining an assigned value for the pipeline set as a difference between the sum and the pipeline set duty cycle metric,
normalizing the assigned value across the plurality of pipeline sets to obtain the plurality of weights.

8. The computer implemented method of claim 1, wherein determining the weight for the pipeline set comprises:
determining, for the pipeline set, a pipeline set duty cycle metric from the plurality of duty cycle metrics,
generating a sliding window average of incoming jobs to the plurality of pipeline sets, and
when the sliding window average is greater than zero, assigning a value to the pipeline set using a periodic update model to obtain an assigned value, and
normalizing the assigned value across the plurality of pipeline sets to obtain the plurality of weights.

9. The computer implemented method of claim 1, wherein determining the weight for the pipeline set comprises:
sorting the plurality of pipeline sets in increasing order of a plurality of pipeline set duty cycle metrics to create an ordered list, wherein each pipeline set duty cycle metric is determined from the plurality of duty cycle metrics for a corresponding pipeline set,
generating a sliding window average of incoming jobs to the plurality of pipeline sets, and
identifying a maximal position in the ordered list in which the sum of a pipeline set duty cycle metric at the maximal position minus the duty cycle metric of a subset of the plurality of duty cycle metrics up to the maximal position is greater than or equal to the sliding window average, the pipeline set duty cycle metric being in the plurality of pipeline set duty cycle metrics, and
setting an assigned value to zero for each pipeline set in the ordered list that is at a position greater than the maximal position.

10. A computer implemented system for assigning executable jobs to pipeline sets comprising:
at least one aggregation thread configured to:
generate a weight for each pipeline set of a plurality of pipeline sets to obtain a plurality of weights, wherein generating the weight for a pipeline set comprises:
obtaining a plurality of duty cycle metrics for a plurality of pipeline threads in the pipeline set,
wherein the plurality of duty cycle metrics comprises a measure of an amount of time that a corresponding pipeline thread is executing and actively processing data,
wherein obtaining a duty cycle metric comprises:
assigning a duty cycle ownership object to a thread, and
when a set of conditions is satisfied,
setting the duty cycle ownership object to an on state, and
processing a data object in a consumer queue while the duty cycle ownership object is in the on state,
wherein the set of conditions comprises the data object existing in the consumer queue of the thread, and
determining the weight for the pipeline set based at least in part on the plurality of duty cycle metrics; and
a computer processor executing an assigner for causing the computer processor to:
assign a job request to a target pipeline set selected, using the plurality of weights, from the plurality of pipeline sets.

11. The computer implemented system of claim 10, wherein generating the weight further comprises:
determining an average number of data ingestion tasks assigned to the plurality of pipeline sets, wherein determining the weight is based on the average number of data ingestion tasks.

12. The computer implemented system of claim 10,
wherein the duty cycle ownership object is switched to an off state after processing the data object, and
wherein obtaining the duty cycle metric further comprises keeping the duty cycle ownership object in the off state when the consumer queue is empty.

13. The computer implemented system of claim 10,
wherein the duty cycle ownership object is set to the on state within a scope defined by determining that the set of conditions are satisfied,
wherein the data object is processed in the consumer queue while within the scope, and
wherein obtaining the duty cycle metric further comprises exiting the scope to switch the duty cycle ownership object to an off state.

14. The computer implemented system of claim 10, wherein obtaining a duty cycle metric comprises:
reading a plurality of timestamps and state information from the duty cycle ownership object, and
generating, as the duty cycle metric, a weighted moving average using the plurality of timestamps and the state information.

15. The computer implemented system of claim 10, wherein generating the weight comprises:
setting, for at least a subset of the plurality of pipeline sets, a pipeline set duty cycle metric as a maximal duty cycle metric of the plurality of pipeline threads in the pipeline set,
generating a sliding window average of incoming jobs to the plurality of pipeline sets, and
using the sliding window average and a thread set duty cycle metric to determine the weight for the pipeline set.

16. A non-transitory computer readable medium comprising computer readable program code for performing operations, the operations comprising:
generating a weight for each pipeline set of a plurality of pipeline sets to obtain a plurality of weights, wherein generating the weight for a pipeline set comprises:
obtaining a plurality of duty cycle metrics for a plurality of pipeline threads in the pipeline set,
wherein the plurality of duty cycle metrics comprises a measure of an amount of time that a corresponding pipeline thread is executing and actively processing data,
wherein obtaining a duty cycle metric comprises:
assigning a duty cycle ownership object to a thread, and
when a set of conditions is satisfied,
setting the duty cycle ownership object to an on state, and
processing a data object in a consumer queue while the duty cycle ownership object is in the on state,
wherein the set of conditions comprises the data object existing in the consumer queue of the thread, and
determining the weight for the pipeline set based on the plurality of duty cycle metrics; and
assigning a new job request to a target pipeline set selected, using the plurality of weights, from the plurality of pipeline sets.

17. The non-transitory computer readable medium of claim 16, wherein generating the weight further comprises:
determining an average number of data ingestion tasks assigned to the plurality of pipeline sets, wherein determining the weight is based on the average number of data ingestion tasks.

18. The non-transitory computer readable medium of claim 16,
wherein the duty cycle ownership object is switched to an off state after processing the data object, and
wherein obtaining the duty cycle metric further comprises keeping the duty cycle ownership object in the off state when the consumer queue is empty.

19. The non-transitory computer readable medium of claim 16,
wherein the duty cycle ownership object is set to the on state within a scope defined by determining that the set of conditions are satisfied,
wherein the data object in the consumer queue while within the scope, and
wherein obtaining the duty cycle metric further comprises exiting the scope to switch the duty cycle ownership object to an off state.

20. The non-transitory computer readable medium of claim 16, wherein obtaining a duty cycle metric comprises:
reading a plurality of timestamps and state information from the duty cycle ownership object, and
generating, as the duty cycle metric, a weighted moving average using the plurality of timestamps and the state information.

* * * * *